(12) United States Patent
Jayasenan et al.

(10) Patent No.: US 7,894,427 B2
(45) Date of Patent: Feb. 22, 2011

(54) STATEFUL NETWORK ADDRESS TRANSLATION PROTOCOL IMPLEMENTED OVER A DATA NETWORK

(75) Inventors: Siva S. Jayasenan, Cupertino, CA (US); Mike Sullenberger, San Jose, CA (US); Mark Denny, San Jose, CA (US); Murali Venkateshaiah, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 951 days.

(21) Appl. No.: 11/328,804

(22) Filed: Jan. 9, 2006

(65) Prior Publication Data

US 2006/0120366 A1 Jun. 8, 2006

(51) Int. Cl.
*H04L 12/28* (2006.01)
(52) U.S. Cl. ........................... 370/389; 709/223
(58) Field of Classification Search ................. 370/353, 370/401, 469, 389; 709/223
See application file for complete search history.

(56) References Cited

U.S. PATENT DOCUMENTS

| | | | |
|---|---|---|---|
| 4,692,918 A | 9/1987 | Elliott et al. | |
| 5,016,244 A | 5/1991 | Massey, Jr. et al. | |
| 5,018,133 A | 5/1991 | Tsukakoshi et al. | |
| 5,218,600 A | 6/1993 | Schenkyr et al. | |
| 5,371,852 A | 12/1994 | Attanasio et al. | |
| 5,473,599 A | 12/1995 | Li et al. | |
| 5,572,528 A | 11/1996 | Shuen | |
| 5,619,552 A | 4/1997 | Karppanen et al. | |
| 5,729,537 A | 3/1998 | Billstrom | |
| 5,793,763 A | 8/1998 | Mayes et al. | |
| 5,825,759 A | 10/1998 | Liu | |
| 5,862,345 A | 1/1999 | Okanoue et al. | |
| 5,862,451 A | 1/1999 | Grau et al. | |
| 5,943,604 A | 8/1999 | Chen et al. | |
| 6,078,575 A | 6/2000 | Dommety et al. | |
| 6,157,636 A * | 12/2000 | Voit et al. | 370/353 |

(Continued)

OTHER PUBLICATIONS

Release notes for 3Com Corporation, "NETBuilder Family Bridge/Router", pp. 27-29, (Mar. 1994).

(Continued)

*Primary Examiner*—Dang T Ton
*Assistant Examiner*—Wei Zhao
(74) *Attorney, Agent, or Firm*—Weaver Austin Villeneuve & Sampson LLP

(57) ABSTRACT

A technique is disclosed for synchronizing NAT information stored on different network devices that have been configured to implement a network address translation protocol. Each of the network devices includes a respective NAT data structure configured to store NAT information. The NAT information includes at least one NAT entry relating to a network node engaged in a communication session with at least one other network node. At least one NAT entry in a first NAT data structure is modified. The first NAT data structure is associated with a first NAT network device. A first NAT transaction message is generated which includes information relating to the modifications performed on the first NAT data structure. The first NAT transaction message is transmitted to at least one other NAT network device to thereby cause that device to modify its respective NAT data structure using information from the first NAT transaction message. In this way, synchronization of NAT information stored on each of the network devices may be achieved.

30 Claims, 17 Drawing Sheets

U.S. PATENT DOCUMENTS

| | | | |
|---|---|---|---|
| 6,195,705 | B1* | 2/2001 | Leung ................ 709/245 |
| 6,295,276 | B1 | 9/2001 | Datta et al. |
| 6,331,984 | B1 | 12/2001 | Luciani |
| 6,397,260 | B1 | 5/2002 | Wils et al. |
| 6,418,476 | B1 | 7/2002 | Luciani |
| 6,452,924 | B1* | 9/2002 | Golden et al. ............ 370/352 |
| 6,512,774 | B1 | 1/2003 | Vepa et al. |
| 6,697,824 | B1* | 2/2004 | Bowman-Amuah ........ 709/229 |
| 6,801,949 | B1 | 10/2004 | Bruck et al. |
| 2001/0043614 | A1* | 11/2001 | Viswanadham et al. ..... 370/469 |
| 2002/0120697 | A1 | 8/2002 | Generous et al. |
| 2003/0037165 | A1 | 2/2003 | Shinomiya |

OTHER PUBLICATIONS

J. Moy, RFC 1247 "OSPF Version 2", Jul. 19, 1991.

D. Oran, RFC 1142 "OSI IS-IS Intra-domain Routing Protocol", Feb. 1990.

Black, Uyless, "TCP/IP and Related Protocols", McGraw-Hill, Inc., pp. 226-249, 1992.

T. Li, et al., RFC 2281 "Cisco Hot Standby Router Protocol (HSRP)," Mar. 1998.

Chambless, et al., "Home Agent Redundancy Protocol (HARP)," Oct. 27, 1997.

Network Working Group, RFC 2002 "IP Mobility Support," Oct. 1996.

C.E. Perkins and T. Jagannadh, "DHCP for Mobile Networking with TCP/IP," IBM, Watson Research Center IEEE, Apr. 1995.

3Com Corporation, "Configuring Boundary Routing System Architecture," NETBuilder Family Bridge/Router Release Notes, Mar. 1994, pp. 26-29.

K. Egevang et al., "The IP Network Address Translator (NAT)", Network Working Group, pp. 1-10, May 1994.

Daruwalla, et al. "Method for a Cable Modem to Rapidly Switch to a Backup CMTS," U.S. Appl. No. 09/484,611, filed Jan. 18, 2000, 53 Pages.

Zang, et al. "Cable Network Redundancy Architecture," U.S. Appl. No. 09/484,612, filed Jan. 18, 2000, 60 Pages.

Nosella, et al. "Gateway Load Balancing Protocol," U.S. Appl. No. 09/883,674, filed Jun. 18, 2001, 48 Pages.

Leung, et al. "Methods and Apparatus for Implementing Home Agent Redundancy," U.S. Appl. No. 10/008,494, filed Nov. 9, 2001, 53 Pages.

Daruwalla, et al. "Routing Protocol Based Redundancy Design for Shared-Access Networks," U.S. Appl. No. 09/484,189, filed Jan. 18, 2000, 53 Pages.

Kent Leung, "Mobile IP Mobility Agent Standby Protocol," U.S. Appl. No. 09/714,466, filed Nov. 14, 2000, 32 Pages.

Ian Wilson, "Redirection to a Virtual Router," U.S. Appl. No. 09/748,828, filed Dec. 26, 2000, 32 Pages.

Kanekar et al. "Load Sharing and Redundancy Scheme," U.S. Appl. No. 09/342,859, filed Jun. 29, 1999, 68 Pages.

PCT International Search Report with written opinion, Application No. PCT/US2004/019617, Int'l filed Jun. 18, 2004, mailed Jul. 10, 2004.

Nosella et al., U.S. Appl. No. 09/883,674, filed Jun. 18, 2001, Office Action dated May 3, 2005.

Y. Rekhter, et al, "*Address Allocation for Private Internets*," RFC: 1918, Network Working Group, Feb. 1996, 9 Pages.

P. Srisuresh, et al, "*Load Sharing Using IP Network Address Translation (LSNAT)*," RFC: 2391, Network Working Group, Aug. 1998, 18 Pages.

P. Srisuresh, et al, "*IP Network Address Translator (NAT) Terminology and Considerations,*" RFC: 2663, Network Working Group, Aug. 1999, 30 Pages.

E. Gerich, "*Guidelines for Management of IP Address Space,*" RFC: 1466, Network Working Group, May 1993, 10 Pages.

Luciani et al., "Server Cache Synchronization Protocol SCSP", Network Working Group, Apr. 1998.

Moy, J. "OSPF Version 2" RFC 1583, Network Working Group, Mar. 1994.

\* cited by examiner

| Entry Number | Inside Local Addr. and Port | Inside Global Addr. and Port | Outside Global Addr. and Port | Outside Local Addr. and Port | Application Context | Protocol | NAT ID |
|---|---|---|---|---|---|---|---|
| 452 | 454 | 456 | 458 | 460 | 462 | 464 | 466 |

| NAT Entry | Action | Destination B/S/P Address |
|---|---|---|
| 402 | 404 | 406 |

STATEFUL NETWORK ADDRESS TRANSLATION PROTOCOL IMPLEMENTED OVER A DATA NETWORK

RELATED APPLICATION DATA

This application is a continuation under 35 USC §120 of prior U.S. patent application Ser. No. 09/735,199 entitled "Stateful Network Address Translation Protocol Implemented Over A Data Network" by Jayasenan et al., filed on Dec. 11, 2000, which claims benefit under 35 USC §119(e) from U.S. Provisional Patent Application Ser. No. 60/232,152, filed on Sep. 12, 2000, and entitled "Stateful Network Address Translation Protocol Implemented Over a Data Network".

Each of these applications is incorporated herein by reference in its entirety and for all purposes.

BACKGROUND OF THE INVENTION

1. Field of the Invention

The present invention relates generally to data networks, and more particularly to a technique for implementing redundancy of network address translation (NAT) information distributed over a data network.

2. Background

Private networks are commonly connected to the Internet through one or more routers so that hosts (PCs or other arbitrary network entities) on the private network can communicate with nodes on the Internet. Typically, the host will send packets to locations both within its private network and on the Internet. To receive packets from the Internet, a private network or a host on that network must have a globally unique 32-bit IP address. Each such IP address has a four octet format. Typically, humans communicate IP addresses in a dotted decimal format, with each octet written as a decimal integer separated from other octets by decimal points.

Global IP addresses are issued to enterprises by a central authority known as the Internet Assigned Number Authority ("IANA"). The IANA issues such addresses in one of three commonly used classes. Class A IP addresses employ their first octet as a "netid" and their remaining three octets as a "hostid." The netid identifies the enterprise network and the hostid identifies a particular host on that network. As three octets are available for specifying a host, an enterprise having class A addresses has $2^{24}$ (nearly 17 million) addresses at its disposal for use with possible hosts. Thus, even the largest companies vastly underuse available class A addresses. Not surprisingly, Class A addresses are issued to only very large entities such as IBM and ATT. Class B addresses employ their first two octets to identify a network (netid) and their second two octets to identify a host (hostid). Thus, an enterprise having class B addresses can use those addresses on approximately 64,000 hosts. Finally, class C addresses employ their first three octets as a netid and their last octet as a hostid. Only 254 host addresses are available to enterprises having a single class C netid.

Unfortunately, there has been such a proliferation of hosts on the Internet, coupled with so many class A and B licenses issued to large entities (who have locked up much address space), that it is now nearly impossible to obtain a class B address. Many organizations now requiring Internet access have far more than 254 hosts—for which unique IP addresses are available with a single class C network address. It is more common for a mid to large size enterprise to have 1000 to 10,000 hosts. Such companies simply can not obtain enough IP addresses for each of their hosts.

To address this problem, a Network Address Translation ("NAT") protocol has been proposed. See K. Egevang and P. Francis, "The IP Network Address Translator (NAT)," RFC 1631, Cray Communications, NTT, May 1994 which is incorporated herein by reference for all purposes. NAT is based on the concept of address reuse by private networks, and operates by mapping the reusable IP addresses of the leaf domain to the globally unique ones required for communication with hosts on the Internet. Further, to implement NAT, a translation system must be provided between the enterprise private network and the Internet. In implementation, a local host wishing to access the Internet receives a temporary IP address from a pool of such addresses available to the enterprise (e.g., class C 254 addresses). While the host is sending and receiving packets on the Internet, it has a global IP address which is unavailable to any other host. After the host disconnects from the Internet, the enterprise takes back its global IP address and makes it available to other hosts wishing to access outside networks.

FIG. 1 shows a schematic block diagram of a conventional local area network 110 which utilizes a network address translation protocol for communicating with the Internet 120. In the example of FIG. 1, each network device which forms part of the LAN 110 is assigned a unique local IP address using a private addressing scheme specific to that LAN. Additionally, as shown in FIG. 1, the LAN 110 may include at least one network address translation (NAT) gateway device (e.g. routers 102 and 104) for allowing the LAN devices to communicate with external network devices. Conventionally, the function of NAT devices 102 and 104 is to translate local IP addresses to global IP addresses and vice-versa.

Thus, for example, if node 112 desires to transmit a message (e.g. packet) to an external network node (e.g., node 124) via Internet 120, the device 112 may transmit a packet to gateway router 102, which then dynamically assigns a global IP address to be associated with device 112, inserts the assigned global IP address into the header of the packet, and forwards the modified packet onto its destination via Internet 120. When the NAT device 102 receives an external packet whose destination corresponds to the globally unique IP address assigned to node 112, the NAT device 102 modifies the header of the external packet by inserting the locally assigned IP address of node 112, and then forwards the packet to node 112 via LAN 110.

Initially NAT was meant to be deployed in stub domains which typically had only one entry/exit path to the Internet. Currently, however, a LAN may include a plurality of NAT routers, wherein each NAT router may serve as a different entry/exit point. As explained in greater detail below, this has created many significant problems, particularly with respect to network reliability and service disruptions.

Generally, conventional NAT routers manage and translate address/port information as packets travel from one realm to another. For continuous flows, this translation information is stored in a repository until that flow expires. As applications become more complex, the flow attachment records include additional context sensitive information that may be necessary while the flow is unexpired. Typically, NAT routers record all such information. However, if, for any reason, a NAT router fails or has to be restarted, the translation repository and context information on that router will be lost, thereby isolating the end points and making the flow unrecoverable due to loss of NAT Table information for these flows. As a result, LAN clients which had been using the failed NAT router will have to restart their applications in order to re-establish connectivity to the Internet using an alternate NAT router.

Moreover, in most conventional NAT systems, the translation repository or address translation table needs to be continually updated on a per-packet basis. This typically results in thousands of translation updates per second, which makes off-box NAT redundancy updates impractical.

In light of the above, it will be appreciated that there is a continuing need to improve upon network address translation techniques in order to provide improved network performance and failover capability.

DETAILED DESCRIPTION OF THE PREFERRED EMBODIMENTS

Figure 1:
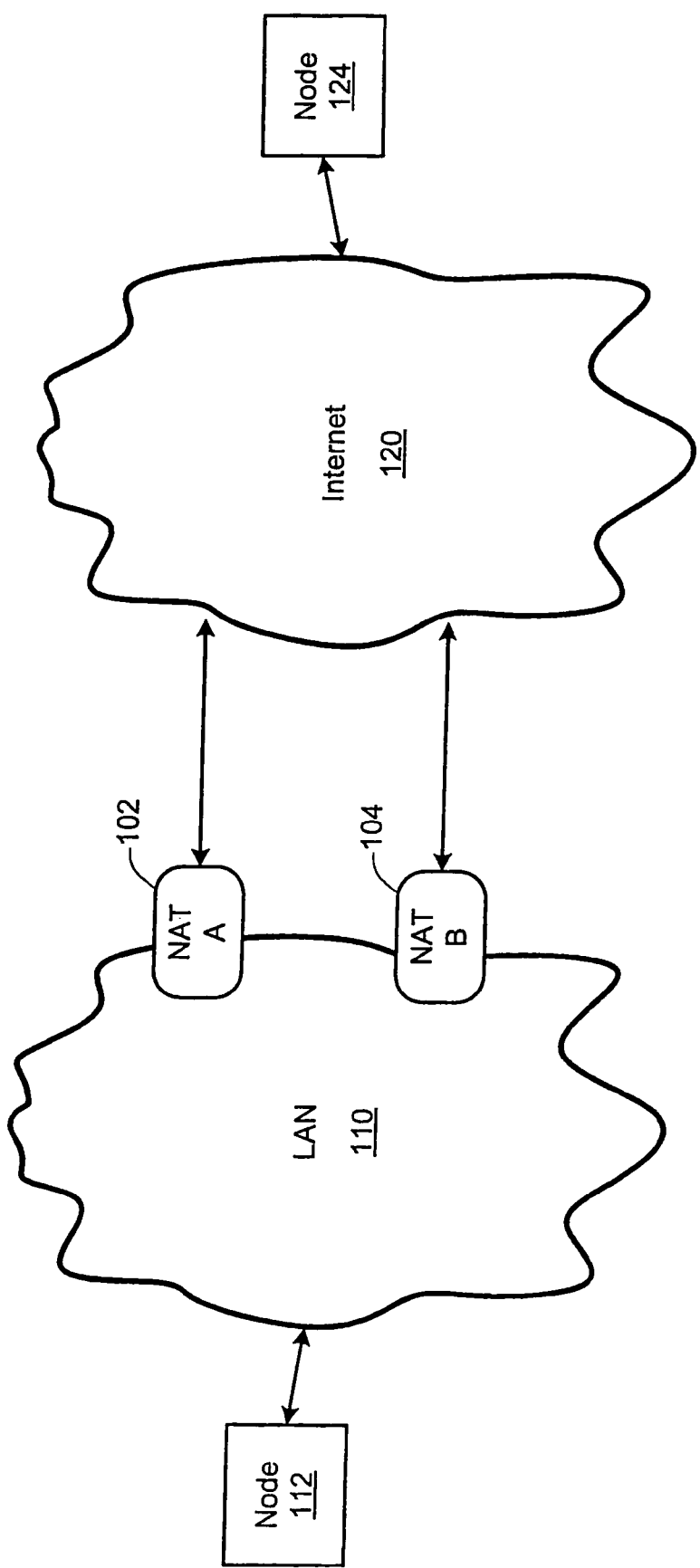
FIG. 1 shows a schematic block diagram of a conventional local area network 110 which utilizes a network address translation protocol for communicating with the Internet 120.
Figure 2A:
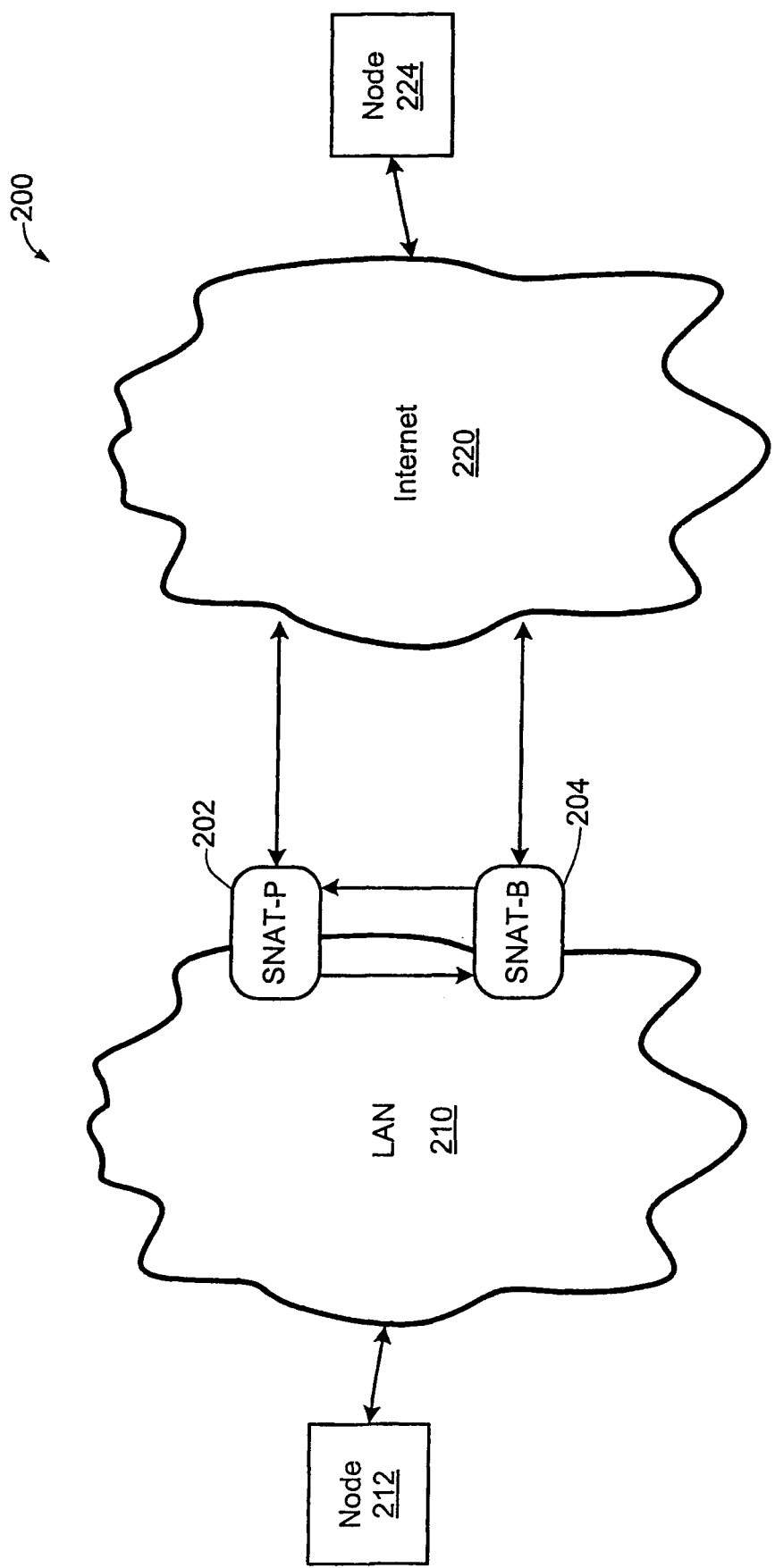
FIGS. 2A-2C illustrate a block diagrams of specific embodiments of different data network configurations which may be used to implement the stateful network address translation technique of the present invention.

FIG. 2A shows a block diagram of a data network 200 which utilizes a network address translation (NAT) protocol in accordance with a specific embodiment of the present invention. As shown in FIG. 2A, a plurality of NAT-configured traffic handling devices 202, 204 are used to provide connectivity between network devices on LAN 210 and the Internet 220. In the embodiment of FIG. 2A, traffic handling device 202 is configured as a primary stateful NAT (SNAT) router, and traffic handling device 204 is configured as a backup SNAT router. Together, these two routers form a primary-backup redundancy group for failover protection.

As described in greater detail below, stateful network address translation information is transmitted from the primary SNAT router 202 to the backup SNAT router 204, which records the stateful NAT information. In the event that the primary SNAT router goes down, the backup SNAT router may use its stored stateful NAT information to temporarily take over the functions and operations of the primary SNAT router, thereby enabling existing flows between the LAN devices and the Internet to continue without service interruption. According to a specific implementation, each of the SNAT routers 202, 204 may be configured to support traditional NAT mapping rules.

The backup SNAT router 204 may be configured to serve as a repository for storing translation entries and their context information, which is received from the primary SNAT router 202.

In the embodiment of FIG. 2A, primary SNAT router 202 may be configured to create, delete and/or modify NAT translation entries in a network address translation (NAT) Table (e.g. 326, FIG. 3) residing on primary SNAT router 202. Timer management of the entries in the NAT Table may also be updated by the primary SNAT router.

Periodically the primary SNAT router will transmit to the backup SNAT router updated information (herein referred to as SNAT messages) relating to any changes, updates or modifications made to the primary router's NAT table. In one embodiment, transmission of SNAT messages may by periodically initiated by the router generating the SNAT message information. Thus, for example, the backup SNAT router may be configured to operate in a listening mode in order to receive information transmitted from the primary SNAT router relating to modifications and/or updates of entries in the primary NAT table. In an alternate embodiment, transmission of SNAT messages may be initiated in response to a request from another network device, such as, for example, the backup SNAT router. Thus, for example, if the primary SNAT device receives a request from the backup SNAT device for a dump of the primary NAT Table, the primary device complies by sending one or more SNAT messages to the backup SNAT device which include information relating to the current NAT entries in the primary NAT Table. This may happen, for example, after initialization or restart of the backup SNAT device. The backup SNAT router may then update its NAT Table using the SNAT message information received from the primary device. In this way, synchronization of information contained in each of the primary and backup NAT tables may be achieved.

When a failure is detected at the primary SNAT router, the backup SNAT router may then operate in a proxy primary mode and activate the entries in its repository for the failed primary SNAT router until the primary SNAT router comes back online. Additionally, when the backup router operates in proxy primary mode, it may start or reset the timers on each of the NAT entries associated with the primary router, and may also assume the task of creating new NAT entries in it's respective NAT table (e.g. the backup NAT table). It may also assume the other functions normally performed by the primary router. When a SNAT router is first configured as a backup device, such as, for example, after a reload or a configuration change, it may send a request to the primary SNAT device to get a dump of the entire primary NAT Table. The backup SNAT device may also be configured to respond to a request from the primary SNAT device for a dump of the contents of the backup NAT Table.

According to a specific embodiment, when a SNAT router becomes primary such as, for example, after a reload or after a configuration change, it may poll the backup router to receive all or selected portions of the stateful NAT information stored in the backup SNAT router's NAT Table. Thereafter, the primary SNAT router may resume its function of NAT entry management.

Generally, it will be appreciated that the above-described techniques for achieving synchronization of information contained in NAT tables of primary/backup configured SNAT devices may also be applied to active/standby configured SNAT devices and peer-peer configured SNAT devices, which are described in greater detail below.

Additionally, it will be appreciated that the stateful NAT redundancy technique of the present invention provides a number of advantages over conventional NAT protocols. For example, the technique of the present invention may be used to enhance reliable delivery of packets in packet-switched computer networks, may provide for improved overall network performance and reliability. Further, according to at least one embodiment, the technique of the present invention may be implemented in conventional NAT systems without requiring any changes to existing network protocols or network applications. Additionally, the technique of the present invention provides for increased availability in co-located NAT environments.

Further, it will be appreciated that the stateful NAT redundancy technique of the present invention may be implemented in various redundancy group topologies such as, for example, one-one, one-many, and/or many-many, thereby providing improved reliability. This is shown, for example, in FIGS. 2B and 2C of the drawings.

Figure 2B:
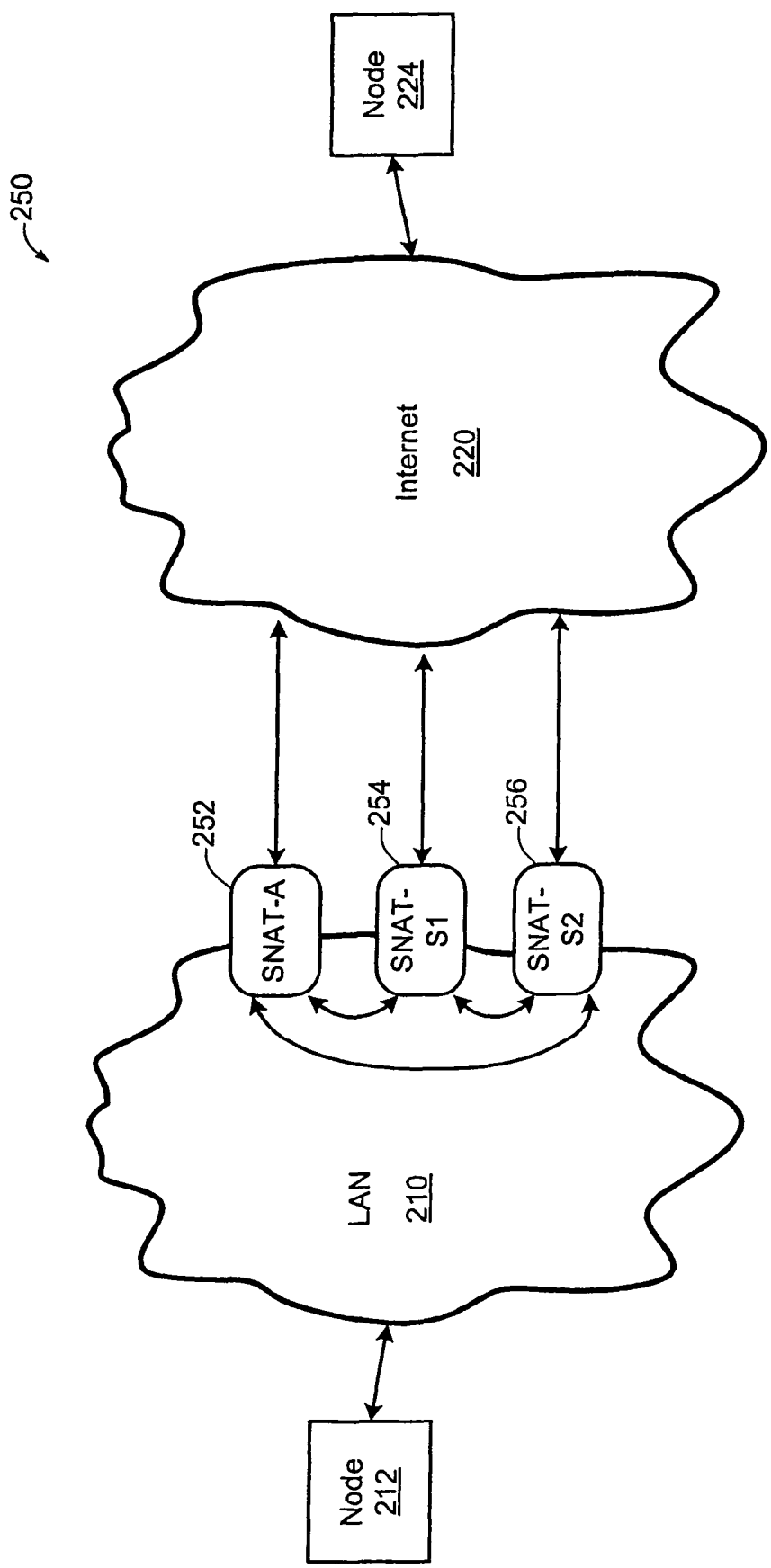

FIG. 2B shows a block diagram of a specific embodiment of data network 250 which may be used for implementing stateful network address translation redundancy in active-standby redundancy groups. As shown in FIG. 2B, a plurality of active/standby NAT traffic handling devices are used to provide connectivity between network devices on the LAN 210 and the Internet 220.

In the embodiment of FIG. 2B, each of the plurality of traffic handling devices 252, 254, 256 corresponds to a router that is configured to utilize a redundancy protocol such as, for example, the Hot Standby Router Protocol (HSRP), described in greater detail in RFC 2281, entitled, "Cisco Hot Standby Router Protocol (HSRP)", by T. Li, B. Cole, P. Morton, and D. Li; and in U.S. Pat. No. 5,473,599 issued to Li and Cole on Dec. 5, 1995. Each of these references is incorporated herein by reference in its entirety for all purposes.

In the example of FIG. 2B, it is assumed that each of the plurality of routers 252, 254, 256 is configured to participate in at least one redundancy group, such as that defined by HSRP. However, it will be appreciated that other redundancy protocols may be utilized in other implementations of the present invention. Such other redundancy protocols will be apparent to one having ordinary skill in the art.

In the embodiment of FIG. 2, SNAT device 252 is configured as an active router of the HSRP group, and SNAT devices 254 and 256 are configured as standby routers for the HSRP group. Upon initialization, each of the routers utilizes the HSRP protocol in order to determine the other network devices in its redundancy group, and thereafter establishes a connection with each of these devices. It will be appreciated that the redundancy group may include one active SNAT router and at least one standby SNAT router. Further, the stateful NAT technique of the present invention may be designed to support any desired number of HSRP groups.

According to the embodiment of FIG. 2B, each of the routers in the redundancy group maintains a respective NAT Table as shown, for example, in FIG. 3 of the drawings (described in greater detail below). In at least one implementation, the active SNAT router transmits to each of the standby SNAT routers updated information relating to any changes and/or modifications made to the active NAT Table. Once a standby SNAT router receives the updated NAT information from the active SNAT router, the standby SNAT router uses the received information to update and/or modify its respective NAT Table in order to synchronize the data contained in the active and standby NAT Tables.

According to an alternate implementation, the standby SNAT routers are able to maintain duplicate records of the NAT Table entries stored in the active SNAT router by periodically sending requests to the active SNAT router for a dump of all or a selected portion of the NAT Table entries maintained by the active SNAT router. Response to the NAT entry request may be achieved, for example, by utilizing a messaging protocol such as that shown in FIG. 6 of the drawings (described in greater detail below). Thus, for example, according to a specific implementation, when an active SNAT router receives a request from one of its standby SNAT router for a dump of its NAT Table, the active SNAT router may respond by sending a SNAT message which includes a predetermined number of entries at one time to the requesting standby SNAT router using the messaging protocol shown in FIG. 6. In one implementation, the predetermined number of entries in a SNAT message may be equal to the value 10.

According to a different implementation, when a SNAT router is configured as a standby router, it may operate in a "listen" mode, whereby it listens on a specified port or channel for any communication from the active SNAT router, and accepts any NAT entry updates transmitted from the active SNAT router. Communication between the active SNAT router and the standby SNAT router may be accomplished utilizing a Connection Management protocol such as that shown in FIG. 7 of the drawings, and described in further detail below.

According to a specific embodiment of the present invention, the active SNAT router 252 is responsible for creating and managing the NAT entries in the active NAT Table. Any modifications to the active NAT Table entries is then transmitted to the standby SNAT routers, so that they may update their respective standby NAT Tables accordingly. Additionally, timer management of the NAT entries is also managed by the active SNAT router.

When a router becomes active, such as, for example, after a reload or after a configuration change, it may request for a dump of all or selected NAT entries from each of the standby routers in the redundancy group, and then proceed to perform its NAT entry management and timer management functions. When the active SNAT router subsequently becomes a standby SNAT router, it ceases to perform any further NAT entry management or time management functions.

When a SNAT router becomes a standby SNAT router, such as, for example, after a reload or after a configuration change, it may send a request to the active SNAT router to receive a dump of the active router's entire NAT Table. A standby SNAT router may also be configured to respond to a request from an active SNAT router for a dump of all or a selected portion of the standby router's NAT Table. This may happen, for example, when either the active SNAT router was reconfigured or when a router which joined the redundancy group has become the active router.

In the event that a standby SNAT router becomes the active SNAT router in the redundancy group, it may start performing the functions associated with the active SNAT router. Thus, for example, when the standby SNAT router becomes the active SNAT router, it may start creating NAT entries for it's NAT Table, may start the timers on all the entries received from the previous active SNAT router, and may start sending or transmitting updated SNAT messages to the other standby SNAT routers in the redundancy group, if any.

According to a specific embodiment, during times when the active SNAT router becomes a standby SNAT router or when a standby SNAT router becomes an active SNAT router, the given router may enter a synchronization mode. While in synchronization, stateful NAT operations may cease to function in the particular router which is switching from one state to another (e.g. active to standby or vice versa). This could be taken as a convergence time until synchronization is complete. Additionally, according to a specific implementation, during the time that a standby SNAT router is receiving a dump of the NAT table from the active SNAT router, the standby SNAT router may not provide the NAT translation of data packets functionality. Once the transfer is complete, the standby SNAT router may then start or continue to provide NAT translation functionality of data packets. This feature may also apply to other SNAT device configurations such as, for example, primary/backup and peer-peer configured SNAT devices.

According to an alternate embodiment, all NAT information for LAN 210 may be stored in a centralized database. Each of the SNAT routers in the redundancy group may then access the centralized database for storing and/or retrieving NAT state information. However, such an implementation may be undesirable for a number of reasons. For example, an implementation where the NAT Table is maintained in a centralized database is subject to a single point of failure. Further, the speed at which NAT entries in the centralized database may be accessed may be significantly slower than alternative embodiments where each SNAT router maintains its own respective NAT Table.

Figure 2C:
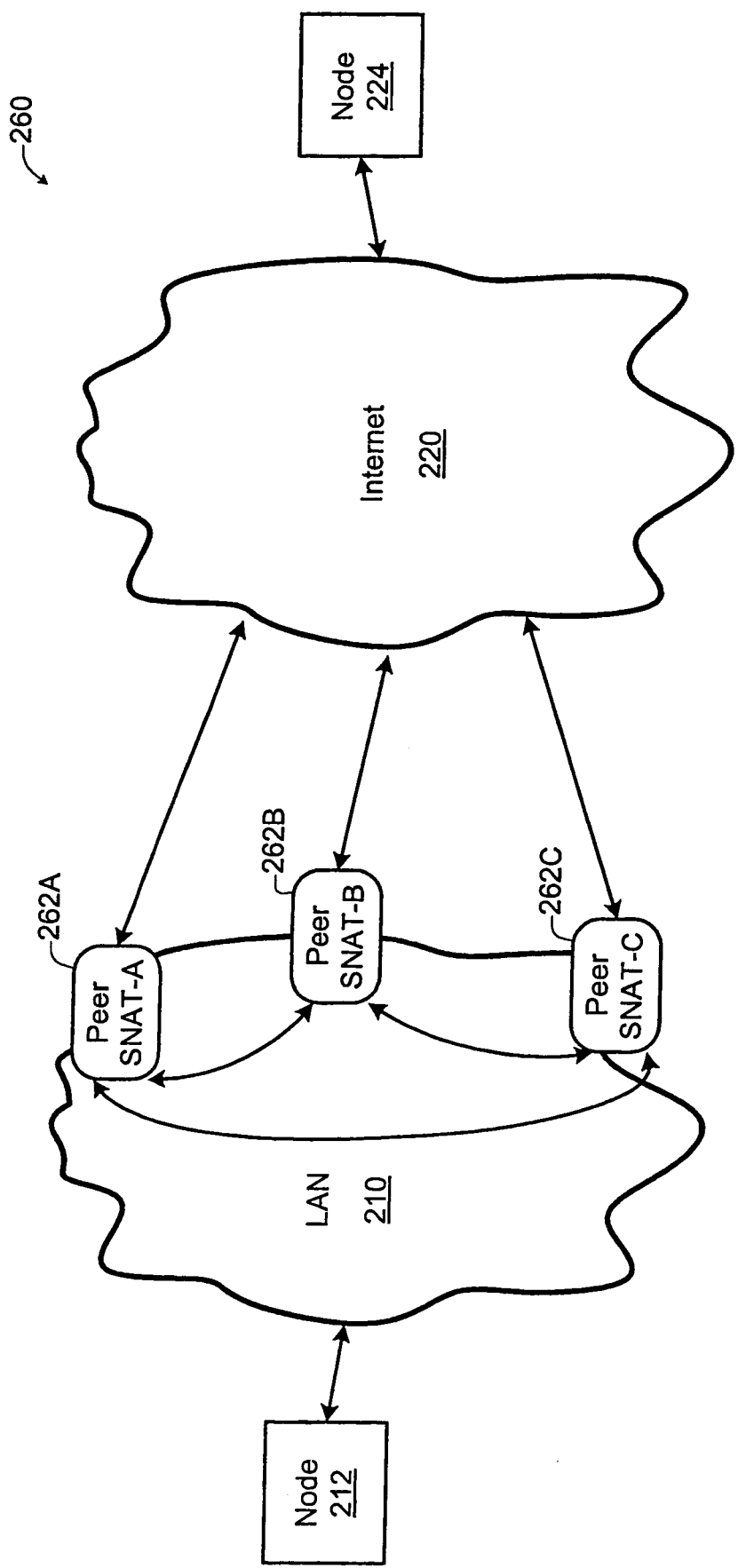

An alternate embodiment of the stateful NAT technique of the present invention is illustrated in FIG. 2C of the drawings. In the embodiment of FIG. 2C, connectivity between the LAN 210 and Internet 220 is achieved via a plurality of stateful NAT-configured network devices 262A, 262B, 262C, wherein at least a portion of the network devices are configured as peer-peer traffic handling devices.

In the example of FIG. 2C, each of the traffic handling devices 262A, 262B, 262C corresponds to a respective peer SNAT router which has been configured to support the stateful NAT technique of the present invention. The stateful SNAT routers of FIG. 2C are further configured to be peers to each other, meaning that each of the stateful SNAT routers is able to create NAT entries in its respective NAT Table, and is further able to update and manage the NAT entries which it creates. According to a specific embodiment, the mappings defined in each of the respective NAT Tables should preferably be unique.

In the example of FIG. 2C, a configuration of three (3) SNAT peer routers is shown. However, it will be appreciated that any number of peers may be implemented to achieve the stateful NAT technique of the present invention.

Figure 11:
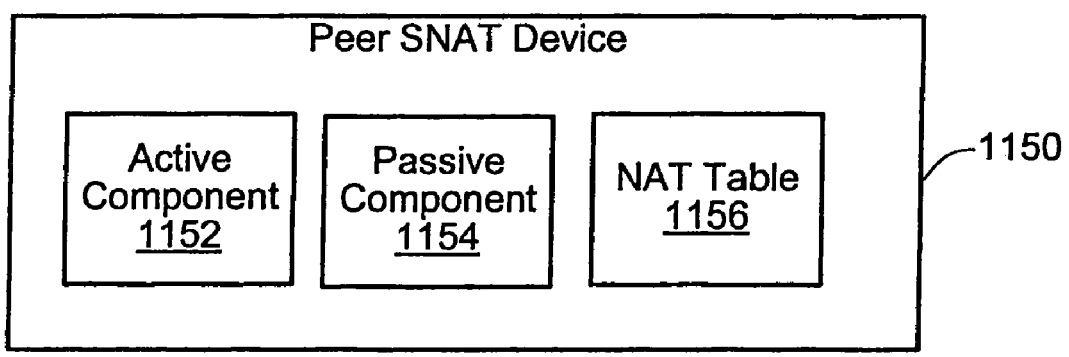
FIG. 11 shows a block diagram of a specific embodiment of a network device 1150 which may be used for implementing the stateful NAT technique of the present invention.

According to a specific embodiment, as shown, for example, in FIG. 11, each peer SNAT device 1150 includes an active component 1152 and a passive component 1154. The active component is responsible for creating, updating, and managing NAT entries that have been created by SNAT device 1150. Additionally, the active component 1152 is responsible for transmitting its stateful NAT information to the other peer SNAT devices. The passive component 1154 is responsible for listening for updated stateful NAT information from the other peer devices, and for updating the device's NAT Table 1156 in accordance with the stateful NAT information received from the other peer devices.

When a traffic handling device such as router 262A is configured as a peer SNAT device (such as, for example, at initialization or restart), it initiates a connection with each of its other peer devices. Additionally, the peer SNAT device also begins accepting connection requests from the other peer devices (if any). This process is described in greater detail below with respect to FIG. 8C.

Figure 7:
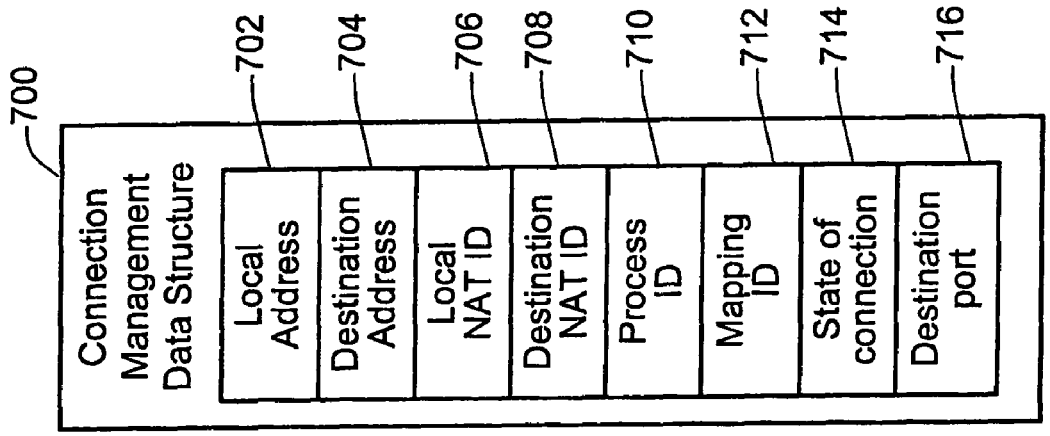
FIG. 7 shows a block diagram of a Connection Management Data Structure 700 in accordance with a specific embodiment of the present invention.
Figure 6:
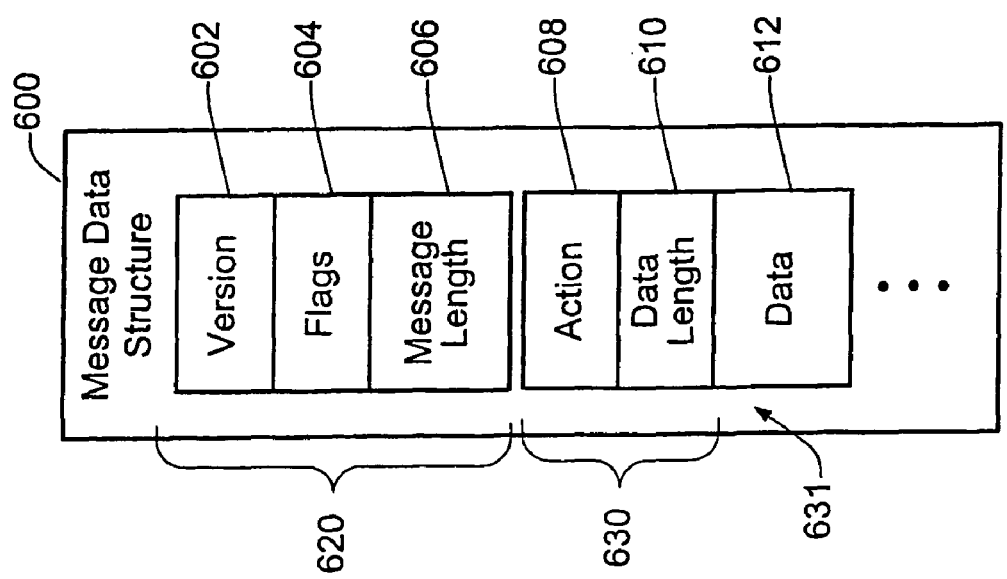
FIG. 6 shows a block diagram of a SNAT message data structure 600 in accordance with a specific embodiment of the present invention.

For example, referring to FIG. 11, when the SNAT device 1150 creates a new NAT entry in NAT Table 1156, it transmits information relating to the new NAT entry to the other peer devices using the Messaging and Connection Management protocols described, for example, in FIGS. 6 AND 7 of the drawings. The passive component in each of the SNAT peer devices will receive the updated SNAT information, and update its respective NAT Table accordingly. According to a specific implementation, the SNAT device does not request for a dump of the peers' NAT Tables, but rather passively listens for the other SNAT peers to transmit their updated SNAT information to the listening SNAT device. When a new SNAT device joins the peer SNAT group, each of the other peer devices may send all of their stateful NAT entries to the new SNAT device. Additionally, the new SNAT device may send all of its NAT entries (if any) to the other peer devices. In addition to the exchange of stateful NAT information between the peer SNAT routers, application specific information, such as, for example, NetMeeting control information, may also be exchanged.

According to at least one embodiment, communication between the peer SNAT devices may be achieved, for example, using a TCP client application, which may be implemented at each SNAT device. Access to the TCP client may be controlled, for example, via an access control list and/or by authentication.

Each peer SNAT device may perform regular management of NAT entries created by that device. NAT entry management may include, for example, creating NAT entries, deleting NAT entries, updating timers related to NAT entries, etc. NAT entries received from peer SNAT devices may be managed by the receiving SNAT device based upon information contained in the SNAT messages transmitted by the other peer device(s). According to a specific implementation, a NAT timer is not activated for NAT entries which were originally created by a different peer SNAT device.

According to a specific embodiment, if a first peer SNAT device loses connectivity to a second peer SNAT device (such as, for example, when the interface to a SNAT router momentarily goes down), all NAT entries stored in the NAT Table of the first SNAT device which are associated with the second peer SNAT device may be deleted. If connectivity to the second SNAT device is subsequently re-established, the first SNAT device may then attempt to re-synchronize its NAT information with the second SNAT device.

As described in greater detail below, each peer SNAT device is configured to process SNAT messages which are received from the other peer SNAT devices. The SNAT messages relate to stateful NAT information, including any changes or modifications of NAT Table entries performed by a particular peer SNAT device. According to a specific implementation, irrelevant messages received from any of the peer devices may be dropped. For example, a SNAT device may drop a delete message for a NAT entry which is not found in the local NAT Table of the SNAT device receiving the message. Additionally, when a SNAT device becomes unavailable such as, for example, when it is being reconfigured, the SNAT device may send an unavailability message to its peer devices. When a peer SNAT device receives the unavailability message, it may each respond by deleting all NAT entries in its respective NAT Table which are identified as being associated with the SNAT device which sent the unavailability message. This is feature is described in greater detail with respect to FIG. 4B. It will be appreciated that this latter implementation may be advantageous in that it would not require the unavailable SNAT device to transmit separate delete messages to each of the peer devices. According to a different implementation, the unavailable SNAT device may transmit a "Delete All" message to the peer SNAT devices which may achieve a result similar to that described above.

According to at least one embodiment, the building blocks for creating, maintaining, and deleting NAT entries may be managed by support systems such as, for example, Address Pool Managers or Port Allocation Managers. In addition, a stateful NAT manager may be provided for performing functions such as, for example, role definition for SNAT routers, peer-peer transport connection management, NAT entry database distribution and management in case of failover, etc. According to a specific embodiment, the stateful NAT manager module may be configured as an umbrella process with its own CLI for configuration, and its own logging/debugging capabilities. Further, according to at least one implementation, the peer-peer stateful NAT embodiment of the present invention may be employed in systems using asymmetric routing. In such implementations, it is desirable to have synchronized NAT Table entries in each of the peer stateful SNAT devices.

Figure 3:
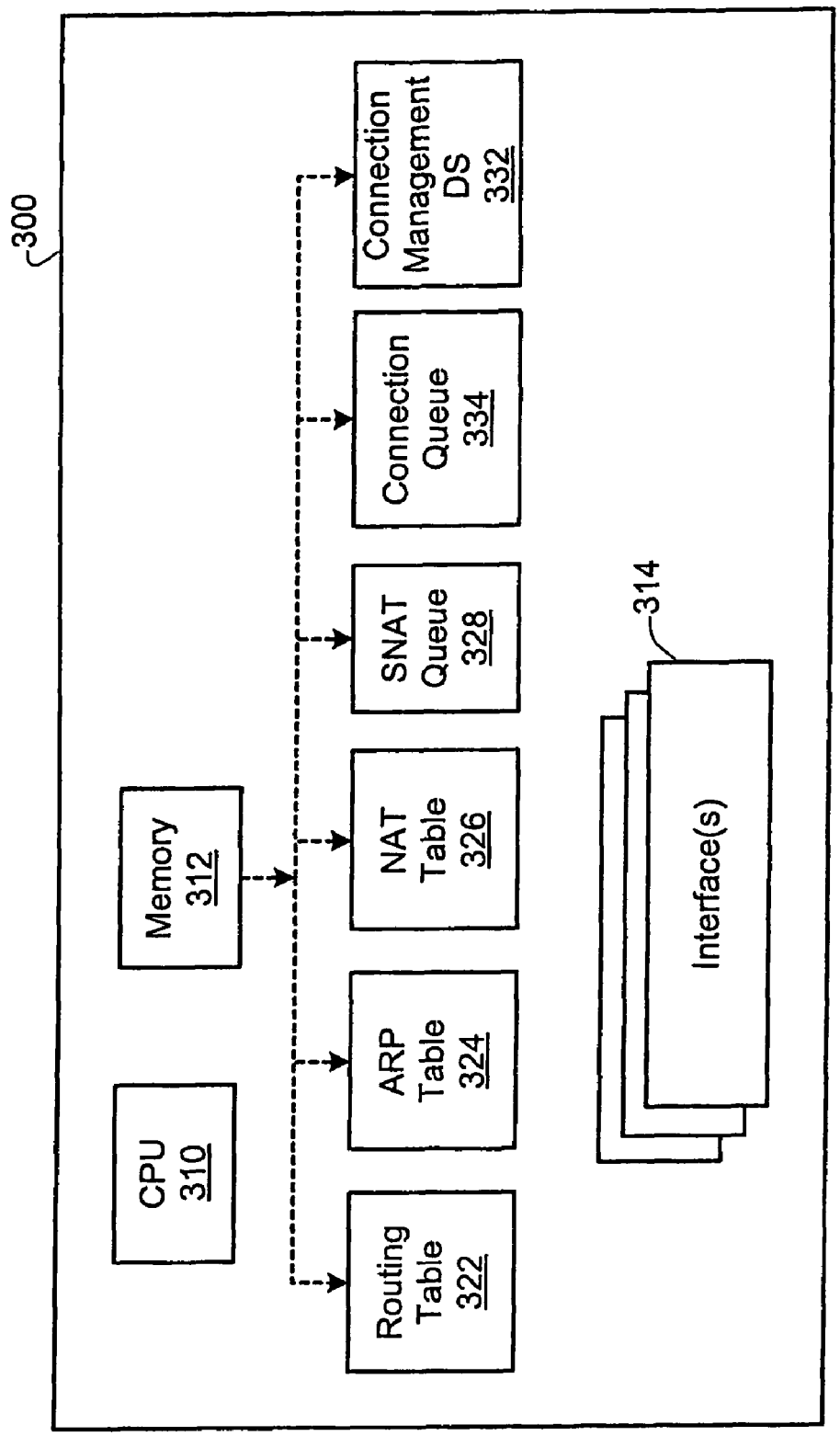
FIG. 3 shows a block diagram of a network device 300 which may be used for implementing the stateful NAT technique of the present invention.

FIG. 3 shows a block diagram of a network device 300 which may be used for implementing the stateful NAT technique of the present invention. According to a specific embodiment, the network device 300 may be configured as a traffic handling device such as, for example, a router or switch.

As shown in the embodiment of FIG. 3, the network device 300 includes at least one CPU 310, memory 312, and at least one interface 314. Further, as shown in FIG. 3, the memory of the network device 300 may include a plurality of different data structures, such as, for example Routing Table 322, Address Resolution Protocol (ARP) Table 324, NAT Table 326, SNAT Queue, Connection Queue 334, Connection Management Data Structure 332, etc. The configurations and functions of Routing Table 322 and ARP Table 324 are commonly known to one having ordinary skill in the art, and are described in greater detail in RFC 1631 (previously incorporated herein by reference). The configuration and functions of NAT Table 326 are similar to those of a conventional NAT Table such as that described in RFC 1631. However, according to at least one embodiment of the present invention, the NAT Table 326 may include additional information which is not stored in a conventional NAT Table, which is described in greater detail below with respect to FIG. 4B of the drawings.

The SNAT Queue 328 may be used to Queue SNAT messages which are to be sent from one SNAT device to another SNAT device such as, for example, a backup, standby, or peer SNAT device. The configuration and functions of the SNAT Queue 328 are described in greater detail below with respect to FIG. 4A of the drawings. Message Data Structure 330 may be used for implementing messaging protocol between SNAT devices, and is described in greater detail below with respect to FIG. 6 of the drawings. The Connection Queue 334 may be used for queuing updated SNAT messages to be transmitted to other SNAT devices in the network, and is described in greater detail with respect to FIGS. 5A and 5B of the drawings. The Connection Management Data Structure 332 may be used to maintain the connection between SNAT devices, and is described in greater detail with respect to FIG. 7 of the drawings.

Figures 4A, 4B:
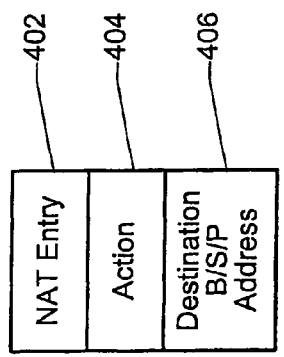
FIG. 4A shows a block diagram of a specific embodiment of a SNAT Queue entry 400, which may be stored within the SNAT Queue of FIG. 3.
FIG. 4B shows a block diagram of a NAT Table entry 452 in accordance with a specific embodiment of the present invention.

FIG. 4B shows a block diagram of a NAT Table entry 450 in accordance with a specific embodiment of the present invention. As shown in FIG. 4B, the NAT Table entry 450 includes an Entry Number Field 452, an Inside Local Address and Port Field 454, an Inside Global Address and Port Field 456, an Outside Global Address and Port Field 458, an Outside Local Address and Port Field 460, an Application Context Field 462, a Protocol Field 464, and a NAT ID Field 466. It will be appreciated that alternate embodiments of the NAT Table of the present invention may include additional information to that shown in FIG. 4B of the drawings, or alternatively may not include all of the information described in FIG. 4B of the drawings.

Entry number Field 452 may be used as identifier to identify a specific entry in the NAT Table. According to a specific implementation, entries in the NAT Table may be assigned sequential entry numbers. The Inside Local Address and Port Field 454 corresponds to the local address and port of the source device (e.g. Node 212) within LAN 210. The Inside Global Address and Port Field 456 corresponds to the global address and port to be used by the source device (e.g. Node 212) outside of LAN 210. The Outside Global Address and Port Field 458 corresponds to the global address and port of the destination device (e.g. 224) to be used within Internet 220. The Outside Local Address and Port Field 460 corresponds to the local address and port to be used by the destination device (e.g. Node 224) within LAN 210. The Application Context Field 462 may be used to keep track of application or transport layer flow information (e.g. TCP sequence number offset values, etc.) for this NAT translation entry. The Protocol Field 464 may be used for the IP protocol number (e.g. 17=UDP, 6=TCP, 47=GRE) of this NAT translation entry.

According to a specific embodiment, the NAT ID Field 466 may be used to identify a particular SNAT device which originally created the corresponding NAT entry. Thus, in one implementation, each SNAT device has an associated NAT ID for uniquely identifying that particular device. For example, the NAT ID could correspond to the ID of primary SNAT device 202 (FIG. 2A), active SNAT device 252 (FIG. 2B), or one of the peer SNAT devices (e.g. 262A) of FIG. 2C. According to at least one embodiment, the ability to modify a NAT Table entry or associated timer may be restricted to the particular SNAT device specified by the value of the NAT ID Field 466. For example, a SNAT device which creates a particular NAT Table entry will store its NAT ID in the NAT ID Field corresponding to that entry so that it may control the timer and modifications relating to that entry. In the peer/peer embodiment of the present invention has shown, for example, in FIG. 2C, the NAT ID Field 466 may be used to restrict control of a NAT Table entry to the SNAT device identified by the NAT ID.

According to a specific implementation, a SNAT device may only modify NAT entries in its local NAT Table which have a NAT ID corresponding to that SNAT device. Management of the other NAT entries in the local NAT Table may be controlled by the peer device specified in the NAT ID Field associated with each NAT entry. For example, if the local NAT Table of a first SNAT device includes a NAT entry having an associated NAT ID corresponding to a second peer SNAT device, the first SNAT device may not delete or modify that NAT entry. However, the NAT entry may be deleted, for example, if the first SNAT device receives a SNAT message from the second SNAT device which includes a delete command corresponding to that NAT entry. Thus, according to a specific embodiment, control of a particular NAT entry within the NAT Table may be exclusively assigned to the SNAT device corresponding to the NAT ID associated with that entry, which, according to one implementation, is the SNAT device which originally created the NAT Table entry. Moreover, according to a specific embodiment, when a copy of a NAT entry is generated in a NAT Table of a different SNAT device, the NAT ID Field of the entry copy will specify the ID of the SNAT device which created the original NAT entry.

Another useful feature of the NAT ID Field 466 is that it enables easy identification of NAT entries associated with a particular SNAT device. Thus, for example, if it is desired to delete all entries which were originally created or generated by a particular SNAT device, the NAT ID Field may be used to quickly identify such entries.

Further, according to a specific embodiment, when a particular SNAT device transmits updated SNAT information to a peer SNAT device, the SNAT information need not include NAT entries which have a NAT ID corresponding to a SNAT device other than the SNAT device transmitting the information. Additionally, according to a specific implementation, if no NAT ID is specified for a particular NAT entry, then that entry may reside only in the local NAT Table and will not be transmitted to the other peer SNAT devices.

FIG. 4A shows a specific embodiment of a block diagram of a SNAT Queue Entry 400, which may be stored within the SNAT Queue 328 of FIG. 3. According to a specific embodiment, the SNAT Queue 328 (FIG. 3) may be used to queue updated stateful NAT information which is to be sent to selected SNAT devices in the network.

As shown in FIG. 4A, the SNAT Queue Entry 400 includes a NAT Entry Field 402, and Action Field 404, and a Destination Device Address Field 406. The NAT Entry Field 402 corresponds to the value of the Entry Number Field 452 associated with a specific NAT Table entry. The Action Field 404 includes a value corresponding to an action to be performed for the specified NAT Table entry identified by the NAT entry Field 502. Examples of different actions which may be performed include update, delete, add, error, etc. The Destination Device Address Field 406 includes one or more addresses of the backup, standby, or peer (B/S/P) SNAT devices which are to receive the updated stateful NAT information corresponding to entry 400 of FIG. 4A.

As described in greater detail below, the entries in SNAT Queue 328 are used to compile updated stateful NAT (SNAT) messages which are then transmitted to selected SNAT devices in the network in order to achieve synchronization of NAT information stored in each of the SNAT devices.

According to a specific embodiment of the present invention, the SNAT messages to be transmitted to the other SNAT devices may be queued in a Connection Queue until they are ready to be transmitted. This is illustrated, for example, in FIGS. 5A AND 5B of the drawings.

Figure 5B:
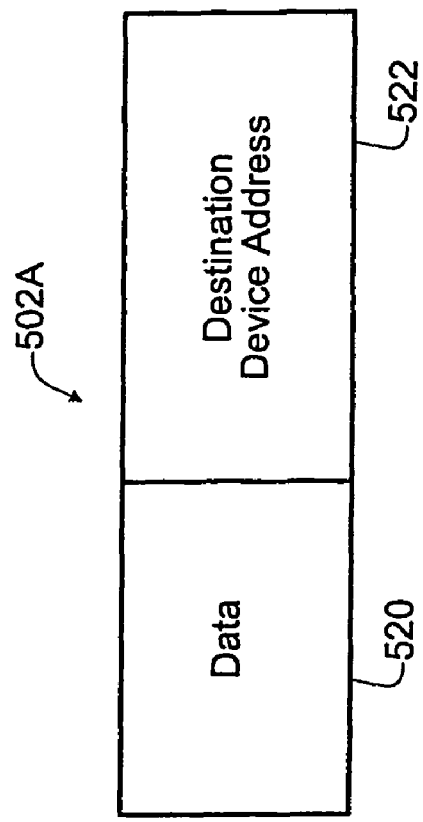
FIG. 5B shows a block diagram of a SNAT message entry 502A, which may be queued in the Connection Queue 500 of FIG. 5A.
Figure 5A:
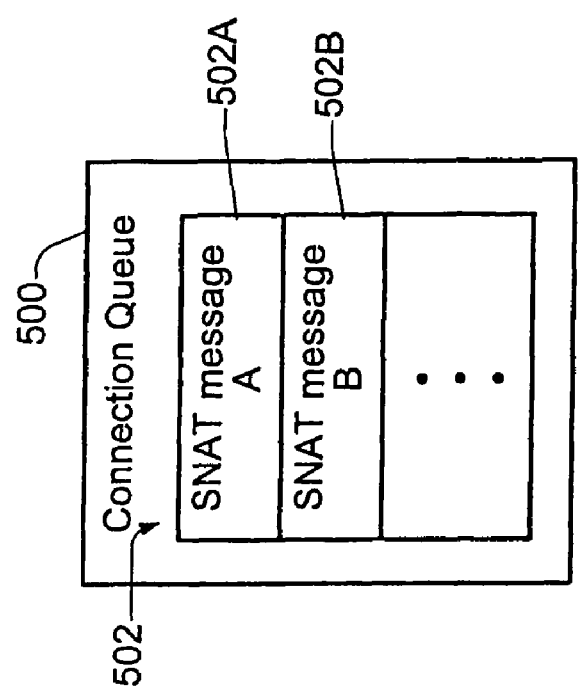
FIG. 5A shows a block diagram of a Connection Queue 500 in accordance with a specific embodiment of the present invention.

FIG. 5A shows a block diagram of a Connection Queue 500 in accordance with a specific embodiment of the present invention. For example, the Connection Queue 500 of FIG. 5A may correspond to the Connection Queue 334 illustrated in FIG. 3 of the drawings.

As shown in FIG. 5A, Connection Queue 500 may include a plurality of SNAT messages 502, wherein each SNAT message comprises updated stateful NAT information which is to be transmitted to other specified SNAT devices in the network.

FIG. 5B shows a block diagram of a SNAT message entry 502A, which may be queued in the Connection Queue 500 of FIG. 5A. As shown in FIG. 5B, the SNAT message entry 502A includes a data portion 520 and a destination device address portion 522. The destination device address portion 522 of the SNAT message may include the address of each SNAT device which is to receive a copy of the data portion 520. According to a specific implementation, the data portion 520 of the SNAT message may be configured to conform with a predetermined messaging protocol such as that defined, for example, by the Message Data Structure 600 illustrated in FIG. 6 of the drawings.

FIG. 6 shows a block diagram of a SNAT message data structure 600 in accordance with a specific embodiment of the present invention. As shown in FIG. 6, the message data structure 600 includes a message header portion 620, a data header portion 630, and a data portion 612. In the embodiment of FIG. 6, the message header portion 620 includes a Version Field 602, a Flag Field 604, and a Message Length Field 606. The Version Field 602 may be used to specify the version of the messaging protocol currently being used. The Flag Field 604 may be used to indicate whether the packet which contains the SNAT message has been authenticated. The Message Length Field 606 may be used for specifying the length of the entire SNAT message.

According to a specific implementation, each SNAT message may include a plurality of different action items 631, where each action item corresponds to a respective entry in SNAT Queue 328. As shown in the example of FIG. 6, each action item 631 may include a data header portion 630 and a data portion 612. The data header portion 630 comprises an Action Field 608 which may be used to specify the type of operation (e.g. authenticate, add, delete, update, error, etc.) to be performed using the data from data Field 612. The Data Length Field 610 may be used to specify the length of the Data Field 612 corresponding to that particular action item. The data portion 612 of the action item may include authentication information or NAT entry details such as those described previously with respect to FIG. 4B of the drawings.

FIG. 7 shows a block diagram of a Connection Management Data Structure 700 in accordance with a specific embodiment of the present invention. The Connection Management Data Structure 700 may be used, for example, for initializing, establishing, and/or maintaining the state of a transport session between two or more SNAT devices. According to a specific implementation, each SNAT device may include one or more separate instances of the Connection Management Data Structure 700. Each instance of the Connection Management Data Structure may be used for maintaining a connection between a local SNAT device and another SNAT device in the network. For example, referring to the embodiment of FIG. 2B, two separate instances of the Connection Management Data Structure may be created in the active SNAT router 252. The first instance of the Connection Management Data Structure may be used for maintaining a connection between active SNAT device 252 and standby SNAT device 254. A second instance of the Connection Management Data Structure may be used for maintaining a connection between active SNAT device 252 and standby SNAT device 256. According to a specific implementation, a connection manager may be implemented in each SNAT device for managing that device's connection to the other SNAT devices. The connection manager may also be responsible for creating and updating each instance of the Connection Management Data Structure within a particular SNAT device.

As shown in the embodiment of FIG. 7, the Connection Management Data Structure 700 may include a plurality of fields such as, for example, a Local Address Field 702, a Destination Address Field 704, a Local NAT ID Field 706, a Destination NAT ID Field 708, a Process ID Field 710, a Mapping ID Field 712, a State Of Connection Field 714, a Destination Port Field 716, etc. The Local Address Field 702 may be used to specify the address of the local SNAT device in which that instance of the Connection Management Data Structure resides. The Destination Address Field 704 may be used to specify the destination address of a particular SNAT device which is to receive the updated SNAT information described herein. The Local NAT ID Field 706 may be used to specify the NAT ID associated with the local SNAT device. The Destination NAT ID Field 708 may be used to specify the NAT ID of the destination SNAT device corresponding to the destination address Field 704. The Process ID Field 710 may be used for specifying the identity of the process that is used for implementing stateful NAT between the two SNAT devices. The Mapping ID Field 712 may be used to identify the mapping translation rule who's entries are distributed by the SNAT process identified by the Process ID. According to a specific implementation, the Process ID and Mapping ID values may each be represented as a four-byte integer number. The State of Connection Field 714 may be used to indicate the state of the connection between the two SNAT devices. Examples of the connection state may include Idle, Connect, Establish, Close, etc. The Destination Port Field 716 may be used to specify a particular port on the destination SNAT device which will be used during the communication session.

According to at least one embodiment, the fields of the Connection Management Data Structure 700 may be used to indicate the state of connection and the options under which the connection has been created. Additionally, the life of a particular instance of the Connection Management Data Structure may be related to the life of the connection between the two SNAT devices.

Stateful NAT Processes

Figure 12A:
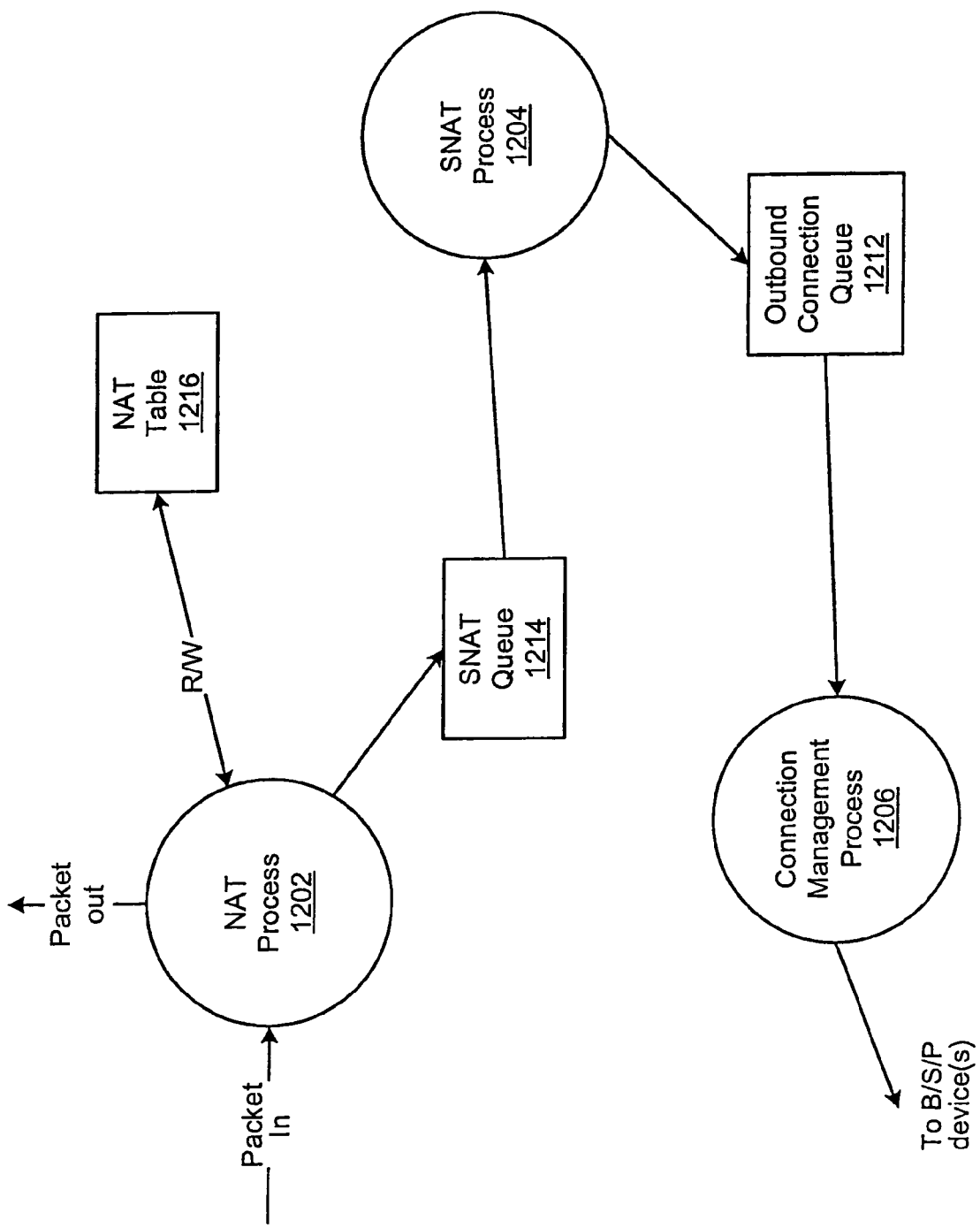
FIGS. 12A and 12B illustrate high-level flow diagrams, showing how the stateful NAT technique of the present invention may be implemented in a network device in accordance with a specific embodiment of the present invention.
Figure 12B:
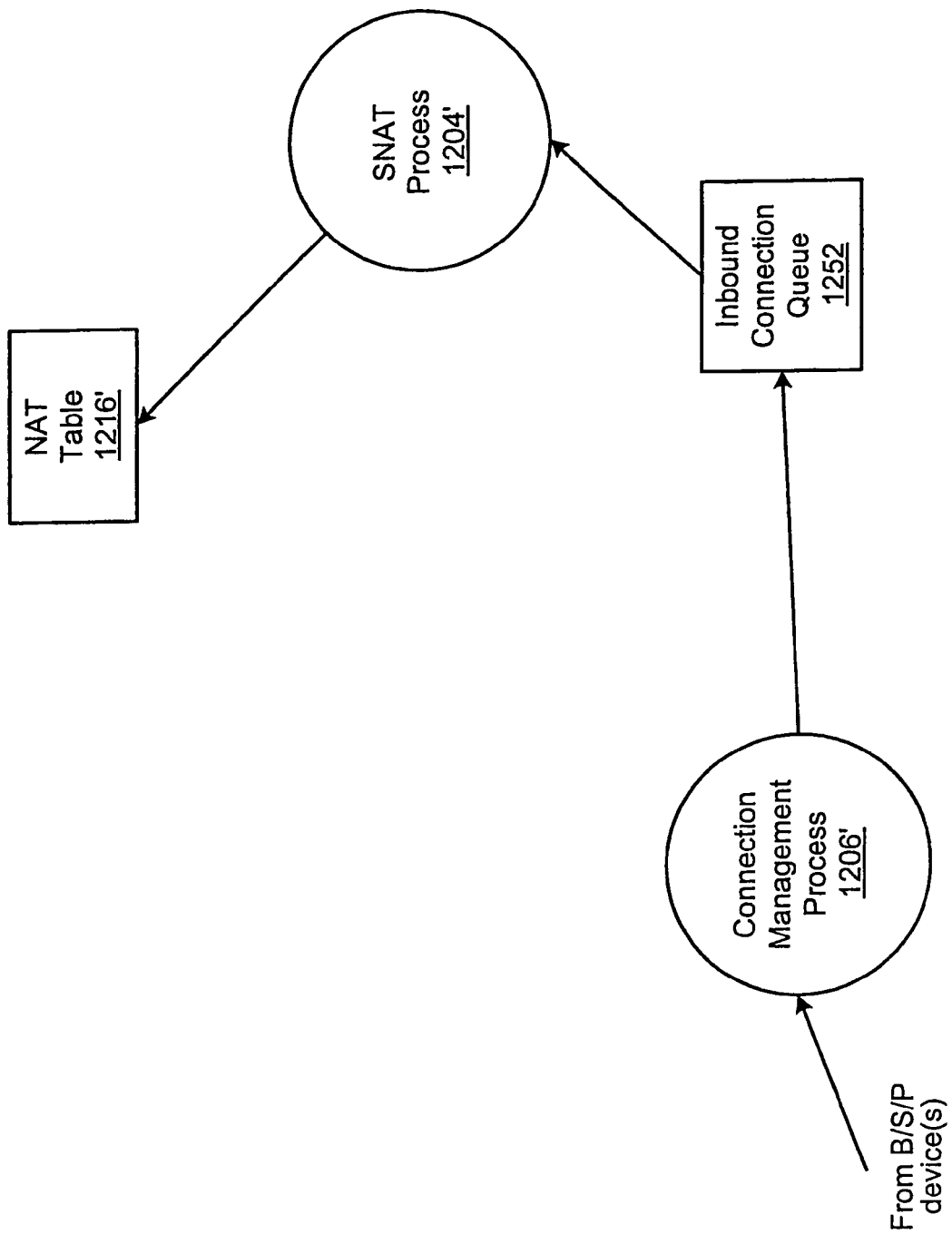

FIGS. 12A and 12B illustrate high-level flow diagrams, illustrating how the stateful NAT technique of the present invention may be implemented in a SNAT-enabled network device such as that shown in FIG. 3. In the example of FIG. 12A, it is assumed that a packet from node 212 (e.g. FIG. 2B) is received at SNAT device 300 of FIG. 3, which, for purposes of illustration may correspond to active SNAT device 252 of FIG. 2B. A NAT Process 1202 at the SNAT device performs any necessary network address translation for the received packet, updates the SNAT Queue 328 (if necessary), and forwards the packet to its destination. The NAT Process 1202 of FIG. 12A is described in greater detail below, with respect to FIG. 9 of the drawings.

According to at least one embodiment, SNAT Process 1204 continually monitors the SNAT Queue 1214 for new entries. Upon detecting a new entry in the SNAT Queue, the SNAT Process 1204 generates a SNAT message which includes information relating to the new SNAT Queue entry, and Queues the SNAT message in the Outbound Connection Queue 1212. The SNAT Process 1204 is described in greater detail below with respect to FIGS. 13A and 13B of the drawings.

According to a specific embodiment, the Connection Management Process 1206 of the SNAT device 300 continually monitors the Outbound Connection Queue 1212 for new SNAT messages. Upon detecting a new SNAT message entry in the Outbound Connection Queue, the Connection Management Process 1206 retrieves the SNAT message from the Outbound Connection Queue and transmits a copy of the SNAT message to each of the specified destination SNAT devices using the Connection Management format defined, for example, in FIG. 7 of the drawings. According to at least one implementation, a separate thread of the Connection Management Process 1026 may be implemented for each destination SNAT device that is to receive a copy of the SNAT message.

FIG. 12B illustrates how a received SNAT message is processed by a backup, standby, or peer network device such as, for example, the standby SNAT device 254 of FIG. 2B. This process is described in greater detail with respect to FIG. 10. Initially, According to a specific implementation, a SNAT message transmitted from an active/primary/peer SNAT device is received at the Connection Management Process (1206') of the standby/backup/peer SNAT device, which then queues the received SNAT message in the Inbound Connection Queue 1252. The SNAT Process 1204' may be configured to periodically monitor the Inbound Connection Queue for newly queued SNAT messages. When the SNAT Process detects the presence of a new SNAT message entry in the Inbound Connection Queue, it retrieves and processes the SNAT message, and updates the NAT Table 1216' (of the standby/backup/peer SNAT device) in accordance with the instructions defined by each SNAT Queue entry in the retrieved SNAT message. According to a specific embodiment, a separate thread of the Connection Management Process 1206 may be implemented for each respective thread of the Connection Management Data Structure existing on the SNAT device.

Figure 8A:
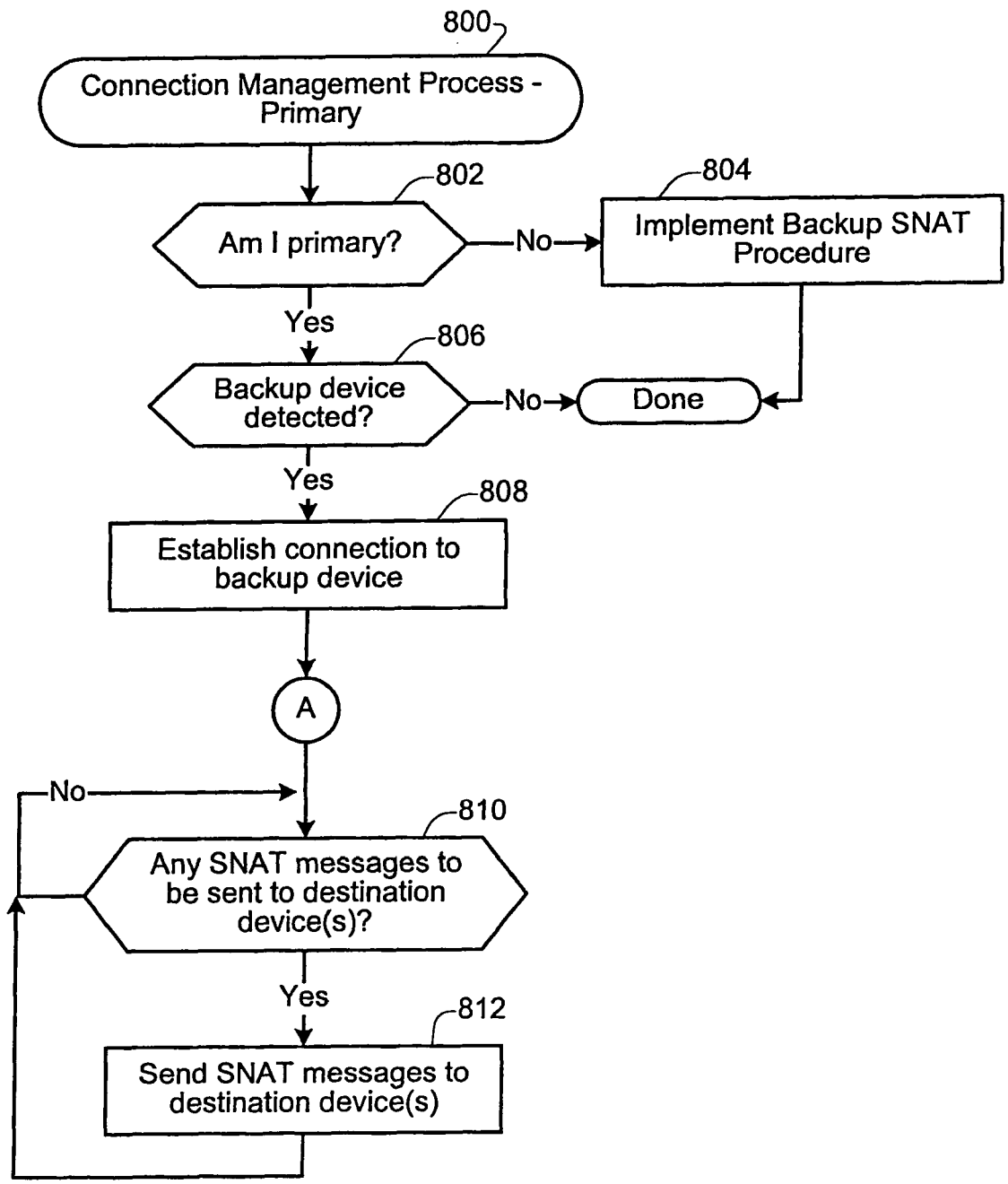
FIG. 8A shows a flow diagram of a Primary Connection Management Process 800 in accordance with a specific embodiment of the present invention.

FIG. 8A shows a flow diagram of a Primary Connection Management Process 800 in accordance with a specific embodiment of the present invention. According to a specific embodiment, the Connection Management Process of FIG. 8 may be implemented on a SNAT device such as, for example, primary SNAT device 202 (FIG. 2A), in order to provide stateful NAT redundancy capabilities.

In the example of FIG. 8A, it is assumed that the Connection Management Process 800 has been implemented on a SNAT device which belongs to a primary-backup redundancy group such as that shown in FIG. 2A. At 802 the SNAT device determines whether it has been configured as a primary or backup device. If the network device determines that it has been implemented as a backup or failover device, then the device attempts to implement (804) a Backup Connection Management Process such as, for example, that described with respect to FIG. 10.

If the network device determines that it has been configured as a primary device, then the SNAT device attempts to detect (806) the presence of a backup network device in its redundancy group. If the primary SNAT device is unable to detect the presence of a backup network device, then there are no further actions to be taken, and the Primary Connection Management Process may be terminated.

Assuming, however, that the primary SNAT device detects the presence of a backup network device, the primary SNAT device then attempts to establish (808) a connection to the backup network device. According to a specific embodiment, this may be accomplished using a Connection Management Data Structure such as, for example, the Connection Management Data Structure 700 of FIG. 7.

Once a connection to the backup device has been established, flow of the Connection Management Process 800 continues from reference point A. Thus, as shown at 810 of FIG. 8A, the primary device determines whether there are any SNAT messages to be sent to the identified destination device(s), which, in the present example is backup device 204 of FIG. 2A. According to an alternate embodiment, this determination may be performed before connection to the backup device is established.

According to one implementation, the primary SNAT device may access the Connection Queue 500 (FIG. 5A) in order to determine whether there are any SNAT messages to be sent to the backup device. If the primary device determines that there are currently no SNAT messages to be sent to the backup SNAT device, the primary device may wait a predetermined time interval before it rechecks the Connection Queue for new SNAT messages to be sent to the backup device. According to a specific implementation, the time interval may be a tunable parameter of the order of milliseconds (e.g. 5-100 milliseconds). However, according to an alternate embodiment, when a new NAT entry is created at a primary/active SNAT device, a triggered update message may be immediately sent to the backup/standby device(s).

Once the primary device determines that there exists at least one SNAT message queued in the Connection Queue, the primary device retrieves the SNAT message, and transmits (812) a copy of the retrieved SNAT message to each of the identified destination device(s). According to a specific embodiment, the primary device may utilize a protocol conforming with the Message Data Structure 600 (FIG. 6) when transmitting SNAT messages to the destination device(s). After the SNAT message has been transmitted to the destination device(s), the primary SNAT device may continue to periodically check the Connection Queue for new SNAT messages to be transmitted.

It will be appreciated that the procedural elements of the Connection Management Process following reference point A of FIG. 8A may be performed by any primary, active, or peer SNAT device.

According to a specific implementation, a TCP connection may be established between at least two SNAT devices in order to allow SNAT messages to be exchanged using the TCP connection. Stateful NAT information may then be exchanged between the SNAT devices, for example, using the message format described in FIG. 6 of the drawings. It will be appreciated, however, that alternative communication protocols may be used for establishing a connection between the SNAT devices such as, for example, UDP, TCP, etc. Further, it will be appreciated that the Connection Management Data Structure 700 may be used to support any type of messaging protocol used between the primary and backup devices.

Figure 8B:
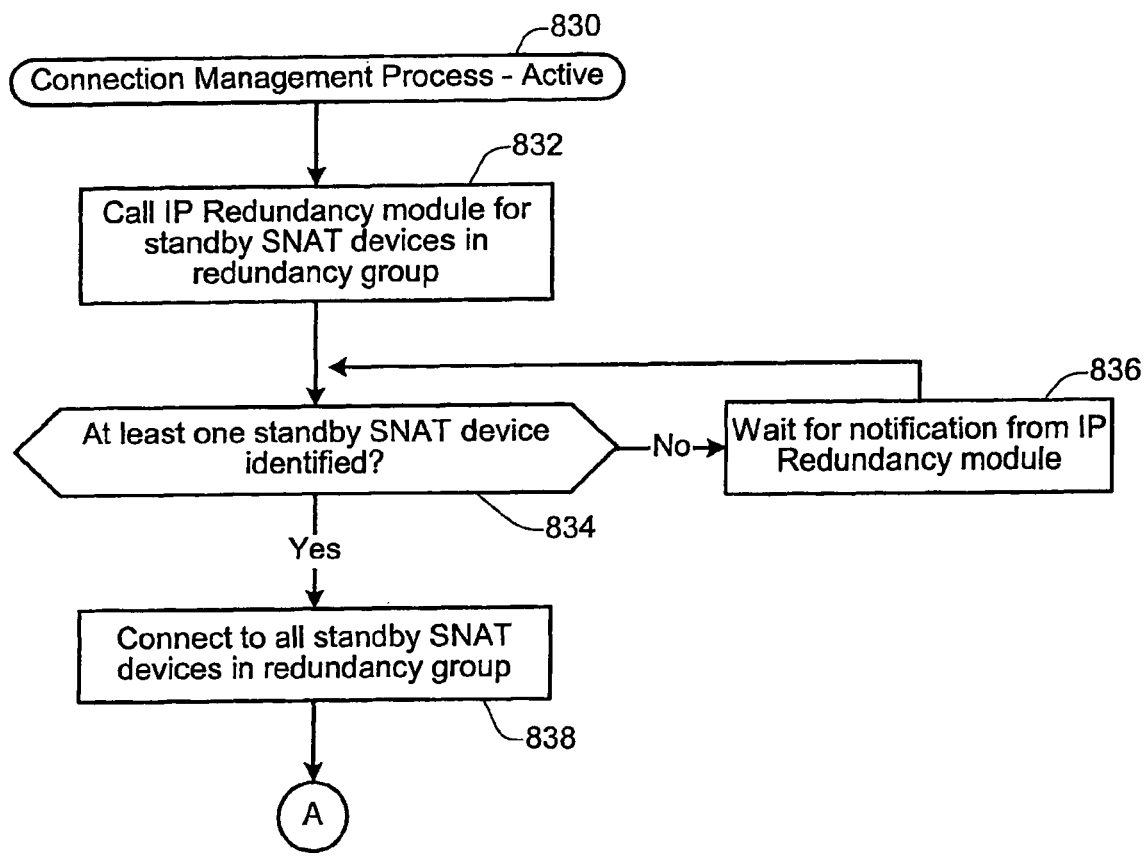
FIG. 8B shows a flow diagram of an Active Connection Management Process 830 in accordance with a specific embodiment of the present invention.

FIG. 8B shows a flow diagram of an Active Connection Management Process 830 in accordance with a specific embodiment of the present invention. According to at least one implementation, the Active Connection Management Process may be implemented on an active SNAT device such as, for example, the active SNAT router 252 of FIG. 2B. It will be appreciated that the Active Connection Management Process of FIG. 8B may be implemented on any SNAT network device which has been configured to function as the active device of a redundancy group. For purposes of illustration, it is assumed that the Active Connection Management Process 830 is being implemented at active SNAT device 252 of FIG. 2B.

At 832 the active SNAT device initiates a call to the IP Redundancy module in order to obtain a list of all standby SNAT devices in its redundancy group. At 834 the active SNAT device attempts to identify at least one standby SNAT device in its redundancy group. If the active SNAT device is unable to identify at least one standby SNAT device in its redundancy group, it will continue to wait (836) from notification from the IP Redundancy module in order to identify at least one standby SNAT device in its redundancy group. Assuming that the IP Redundancy module responds to the active SNAT device with a list of the standby SNAT devices in its redundancy group, the active SNAT device then attempts to connect (838) to each of the identified standby SNAT devices in the redundancy group. Once a connection to a particular standby device has been established, flow of the Active Connection Management Process continues at reference point A of FIG. 8A, wherein any updated SNAT messages may then be sent from the active SNAT device to the connected standby SNAT devices.

Figure 8C:
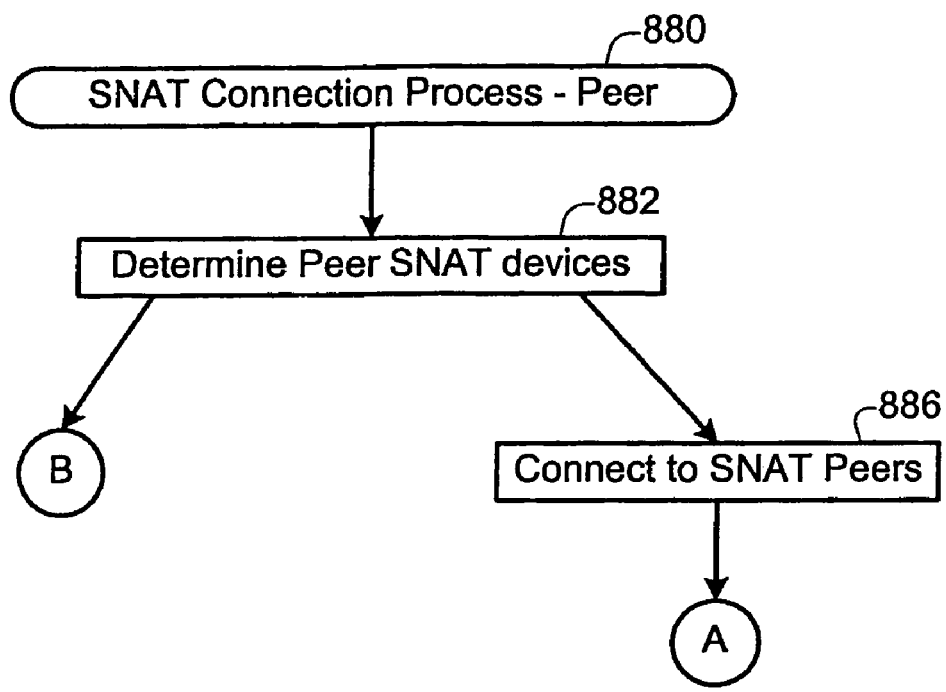
FIG. 8C shows a flow diagram of a Peer Connection Management Process 880 in accordance with a specific embodiment of the present invention.

FIG. 8C shows a flow diagram of a specific embodiment of a Peer Connection Management Process 880 which may be implemented on a peer SNAT device such as, for example, device 262A of FIG. 2C.

When the Peer Connection Management Process 880 is first initiated it attempts to determine (882) the identity of the other peer SNAT devices in its peer group. According to a specific implementation, the identity of the other peer SNAT devices may be determined by consulting a configuration file. Once the identity of the other peer SNAT devices has been determined, the passive component (1150, FIG. 11) of the peer SNAT device listens (884) for a connection from each of the other peer SNAT devices in the peer group. Thereafter, flow of the Connection Management Process for the passive component of the peer SNAT device continues at reference point B of FIG. 10.

Additionally, as shown in FIG. 8C, once the identity of the other peer SNAT devices has been determined, the active component (1152, FIG. 11) of the peer SNAT device attempts to establish (886) a connection to the other identified peer SNAT devices. Thereafter, flow of the Connection Management Process for the active component of the peer SNAT device continues at reference point A of FIG. 8A.

Figure 13A:
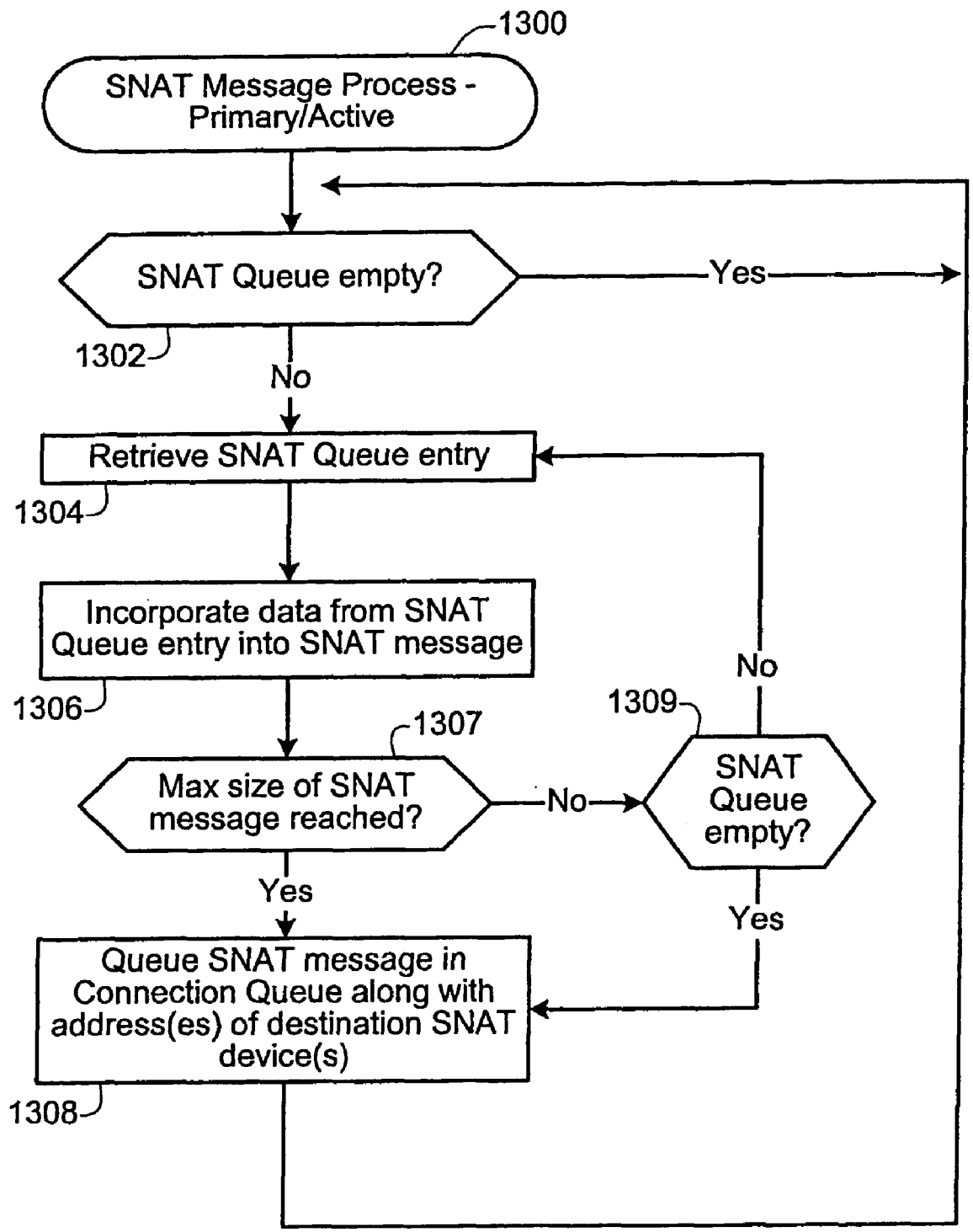
FIG. 13A shows a specific embodiment of a flow diagram for a SNAT Process 1300 of the present invention.

FIG. 13A shows a specific embodiment of a flow diagram for a SNAT Process 1300 which may be used, for example, for implementing the SNAT Process 1204 of FIG. 12A. Thus, according to at least one implementation, the SNAT Process 1300 of FIG. 13A may be implemented on a SNAT device which has been configured as a primary or active SNAT device (which also includes the active component of a peer SNAT device). As stated previously, one function of the SNAT Process is to monitor the SNAT Queue for new entries, and to generate SNAT messages using information from the SNAT Queue entries. This feature is described in the primary/active SNAT Process 1300 of FIG. 13A. Another feature of the SNAT Process is to monitor the Connection Queue for received SNAT messages, and to generate SNAT Queue entries based upon information obtained from the received SNAT messages. This feature is generally described in the backup/standby SNAT Process 1350 of FIG. 13B.

Referring first to the primary/active SNAT Process 1300 of FIG. 13A, at 1302 the SNAT Process continually monitors the SNAT Queue for new entries. When a new SNAT Queue entry is detected in the SNAT Queue, the entry is retrieved (1304), and the data from the retrieved SNAT Queue entry is incorporated (1306) into a SNAT message currently being generated by the SNAT process. At 1307 a determination is made as to whether the maximum allowable size of the SNAT message has been reached. According to a specific embodiment, the maximum allowable size of a SNAT message may be statically or dynamically configured to a value which does not exceed the maximum allowable packet size, typically specified by the network communication protocol. Further, according to one implementation, the maximum size of a SNAT message may be described in terms of a maximum number of SNAT Queue entries to be included in any given SNAT message, or, alternatively, may be specified as a maximum byte value.

Assuming that the maximum SNAT message size has not been reached, the SNAT Queue is again checked (1309) for new entries. If new entries are detected in the SNAT Queue, the entries are retrieved and complied (e.g. appended) into the SNAT message currently being generated (assuming that there is sufficient space available). According to a specific embodiment, the resulting SNAT message will have a format similar to the SNAT Message Data Structure 600 of FIG. 6.

If it is determined that there are no more entries in the SNAT Queue to be retrieved, or, alternatively, if it is determined that the maximum size of the SNAT message has been reached, the SNAT message is then queued in the Connection Queue, along with the address(es) of the destination device(s) to which the SNAT message is to be transmitted, as shown, for example, in FIGS. 5A and 5B. Thereafter, the SNAT Process 1300 continues to monitor the SNAT Queue in order to generate additional SNAT messages to be queued in the Connection Queue.

Figure 10:
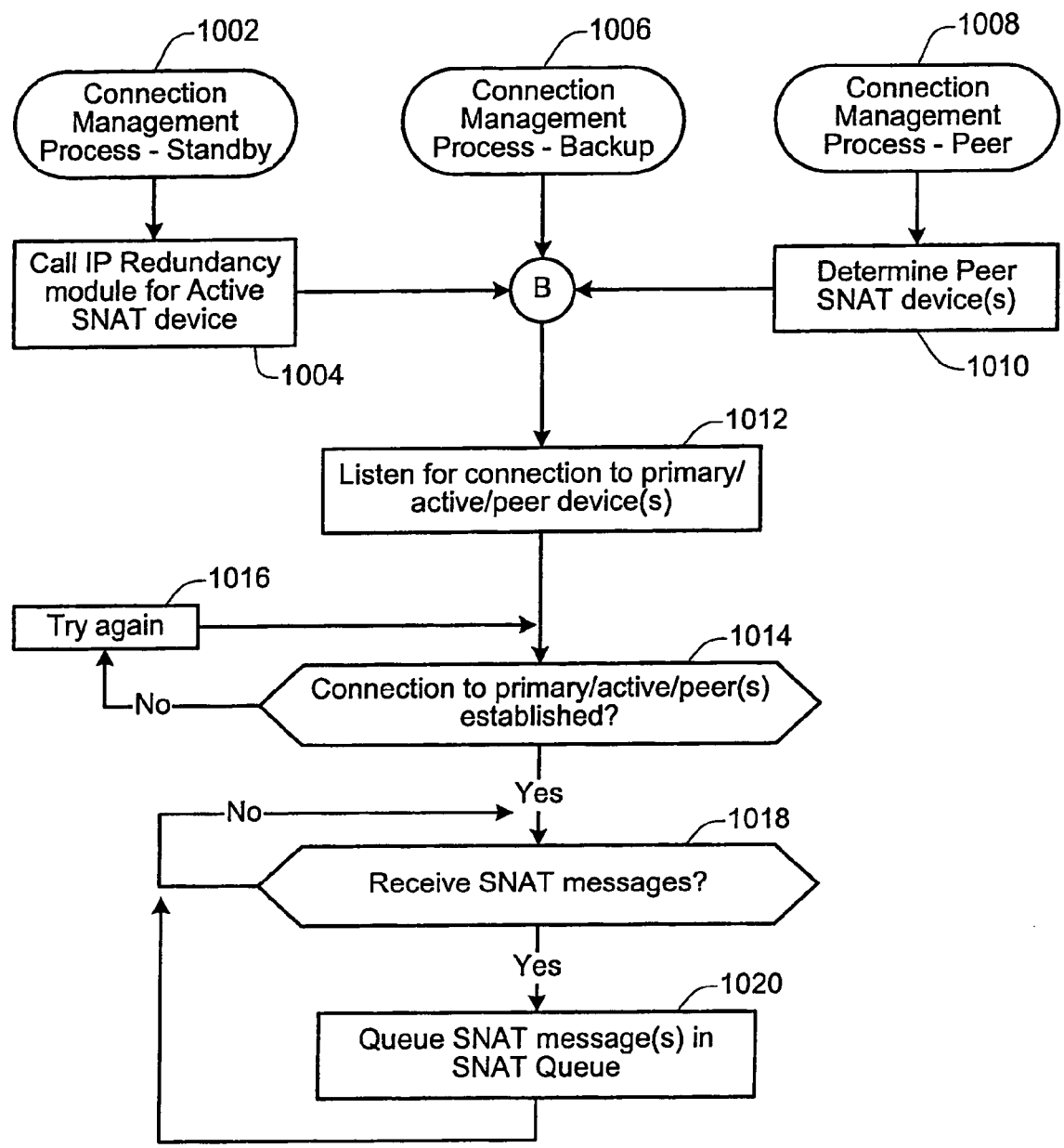
FIG. 10 shows a flow diagram of a Connection Management Process which may be implemented on a backup, standby or peer network device in accordance with a specific embodiment of the present invention.

FIG. 10 shows a flow diagram of a specific embodiment of a Connection Management Process such as that described, for example, in FIG. 12B. According to a specific embodiment, the Connection Management Process shown in FIG. 10 may be implemented in a SNAT device which has been configured as either a backup device (such as, for example, backup SNAT device 204 of FIG. 2A), a standby device (such as, for example, standby SNAT device 254 of FIG. 2B), or a peer device (such as, for example, peer SNAT device 262A of FIG. 2C). As shown in FIG. 10, the initial procedural elements of the Connection Management Process may differ depending upon the configuration of the SNAT device implementing the process. For example, if the SNAT device is configured as a standby SNAT device, the device makes a call (1004) to an IP Redundancy module in order to identify the active SNAT device in its redundancy group. Once the standby SNAT device has determined the identity of the active SNAT device in its redundancy group, the Connection Management Process running on that device may then proceed to reference point B.

Alternatively, if the SNAT device is configured as a peer SNAT device (1008), then, before proceeding to reference point B, the peer SNAT device first determines (1010) the other peer SNAT device(s) in its peer group. This may be accomplished, for example, by accessing a configuration file stored in the memory of the peer SNAT device.

If the SNAT device is configured as a backup SNAT device (1006), the Connection Management Process running on that device may commence at reference point B.

It will be appreciated that the procedural elements of the Connection Management Process following reference point B may be performed by any backup, standby, or peer (B/S/P) SNAT device. Accordingly, many of the figures described in the present application have been drafted to generally describe features which may be applied to any one of the embodiments described in FIGS. 2A-2C of the drawings. Using this generalized description, one having ordinary skill in the art would be able to determine how the described features may be applied to specific implementations of the present invention.

At 1012 of FIG. 10, the Connection Management Process listens for a connection to its respective primary/active/peer device(s) using, for example, the Connection Management Data Structure 700. The Connection Management Process will continue to listen for a connection to its primary/active/peer device(s) until it is detected (1014) that a connection has been established. Once a connection has been established to the primary/active/peer device(s), the Connection Management Process waits (1018) to receive SNAT messages from the primary/active/peer device(s). Upon receiving a SNAT message, the Connection Management Process queues (1012) received SNAT information in the local SNAT Queue 328. After queuing the received SNAT information, the Connection Management Process continues to listen on the communication channel in order to receive additional SNAT messages from the primary/active/peer device(s).

Figure 13B:
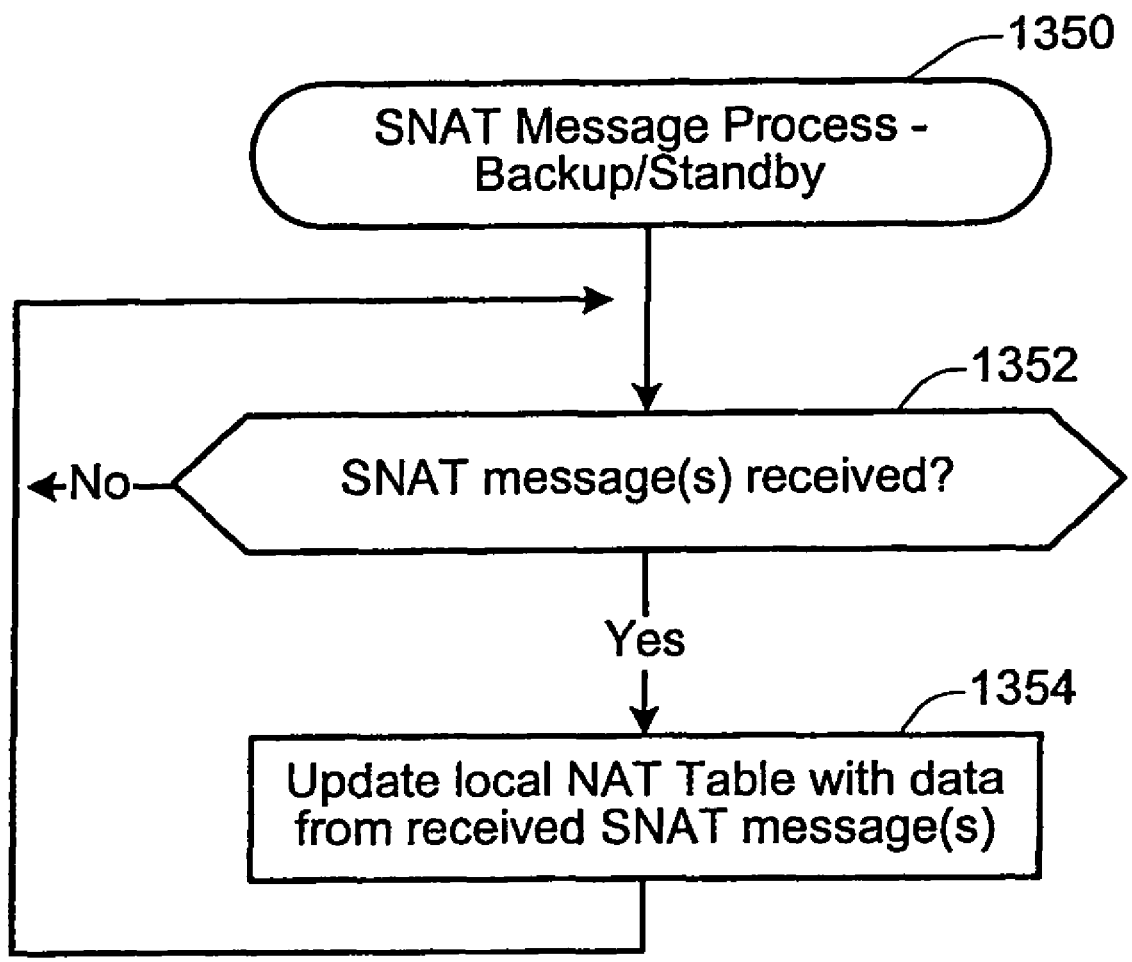
FIG. 13B shows a specific embodiment of a backup/standby SNAT Process 1350 of the present invention.

FIG. 13B shows a specific embodiment of a backup/standby SNAT Process 1350 which may be implemented, for example, by the SNAT Process 1204' of FIG. 12B. At 1352 the SNAT Process continually monitors the Inbound Connection Queue 1252 for any new SNAT messages. Upon receiving a SNAT message from a primary/backup/peer device, the SNAT Process extracts the SNAT Queue entries from the received SNAT message, and uses this information to update (1354) the local NAT Table. In this way synchronicity of NAT Table entries may be achieved between primary/backup, active/standby, or peer/peer SNAT devices.

Figure 9:
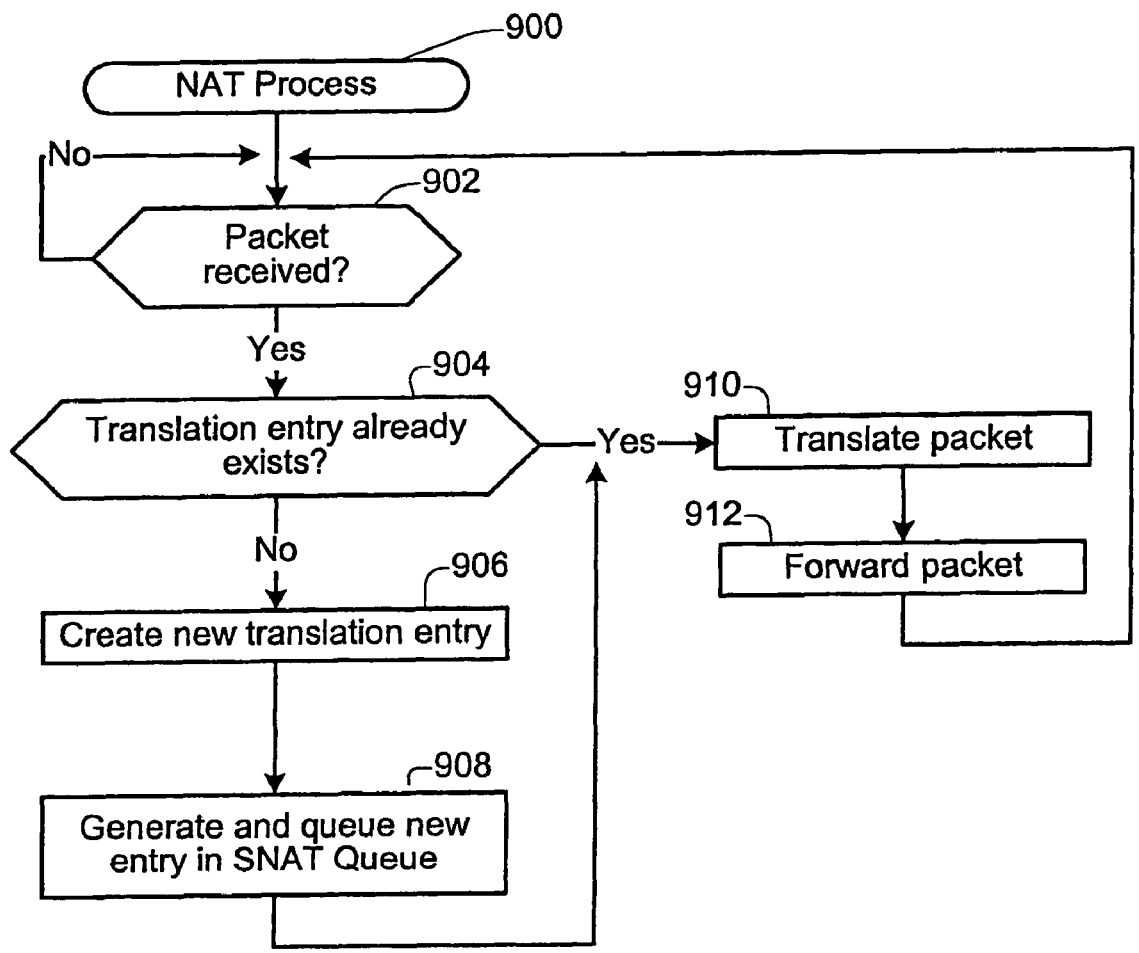
FIG. 9 shows a flow diagram of a specific embodiment of a NAT Process 900.

FIG. 9 shows a flow diagram of a specific embodiment of NAT Process 900, which was described previously with respect to FIG. 12A. In at least one embodiment, a separate instance of NAT Process 900 is implemented in each SNAT device, such as, for example, SNAT device 300 of FIG. 3. As commonly known to one having ordinary skill in the art, conventional NAT procedures are typically used to manage network address translations of packets transmitted between a LAN and an external network. However, a described previously, conventional NAT procedures do not generate or maintain NAT state information to be forwarded to redundant or peer NAT devices in the network. However, as described in greater detail below, the NAT procedure of the present invention, comprises additional features which allows stateful NAT redundancy to be implemented one or more NAT devices of a data network.

Referring to FIG. 9, the NAT Process initially waits (902) to receive a packet. If a packet is received from a source device external to the LAN on which the SNAT device resides (e.g. packet received from node 224, FIG. 2B), the NAT Process performs any necessary network address translation on the received packet in order to forward the packet to the proper destination device on LAN 210. Thus, according to one embodiment, incoming packets from source devices external to the LAN are processed in a manner similar to that of conventional NAT techniques.

However, as shown in FIG. 9, outgoing packets sent, for example, from node 212 to node 224 (FIG. 2B) are processed in a manner different from that of conventional NAT techniques. For example, assuming that the SNAT device receives (at 902) an outgoing packet from node 212, the NAT Process consults its local NAT Table in order to determine (904) whether a translation entry already exists for the source device. If it is determined that a translation entry already exists in the NAT Table, the NAT Process translates (910) the packet using information from the NAT Table entry, and forwards (912) the packet onto its destination using Routing Table 322 (FIG. 3), for example.

If, however, that a translation entry for the identified source device does not exist, a new NAT entry is created (906) in the local NAT Table 326. According to one implementation, the creation of the new NAT entry will conform with the format of NAT entry 450, illustrated in FIG. 4B. Additionally, the NAT Process generates (908) a new SNAT Queue entry corresponding to the newly created NAT entry, and queues the SNAT Queue entry in the SNAT Queue 328 (FIG. 3). Thereafter, the NAT Process translates (910) the outgoing packet, and forwards (912) the packet onto its destination.

The example of FIG. 9 describes how a new NAT entry and corresponding SNAT Queue entry are created in accordance with a specific embodiment of the stateful NAT technique of the present invention. It will be appreciated that the NAT Process 900 may also perform other actions relating to the NAT entries in the NAT Table 326. For example, the NAT Process may delete a NAT entry, may modify or update a NAT entry, report an error for a particular NAT entry, etc. According to a specific implementation, each time the NAT Process creates, modifies, or deletes one or more entries in the NAT Table, it generates a new SNAT Queue entry such as that described previously with respect to FIG. 4A.

Generally, the technique of the present invention may be used for achieving failover, redundancy, traffic load balancing, and/or asymmetric packet routing in a network device. For example, using the technique of the present invention, redundancy may be achieved in NAT-enabled networks which utilize dynamic NAT mapping techniques. Further, the stateful NAT technique of the present invention provides the ability to perform seamless failover of SNAT devices without any significant interruption of service. Additionally, using the stateful NAT technique of the present invention, clients on the LAN need not restart their applications in order to regain connectivity to the external network in the event of a failure of a SNAT gateway device (which provided connectivity to the external network).

OTHER EMBODIMENTS

Generally, the stateful NAT redundancy techniques of the present invention may be implemented on software and/or hardware. For example, they can be implemented in an operating system kernel, in a separate user process, in a library package bound into network applications, on a specially constructed machine, or on a network interface card. In a specific embodiment of this invention, the technique of the present invention is implemented in software such as an operating system or in an application running on an operating system.

A software or software/hardware hybrid implementation of the stateful NAT redundancy technique of this invention may be implemented on a general-purpose programmable machine selectively activated or reconfigured by a computer program stored in memory. Such programmable machine may be a network device designed to handle network traffic, such as, for example, network device 300 of FIG. 3. Such network devices may have multiple network interfaces including frame relay and ISDN interfaces, for example. Specific examples of such network devices include routers and switches. For example, the SNAT devices of this invention may be specially configured routers or servers such as specially configured router models 1300, 2500, 2300, 3300, 4500, 4700, 7200, 7500, and 12000 available from Cisco Systems, Inc. of San Jose, Calif. A general architecture for some of these machines will appear from the description given below. In an alternative embodiment, the stateful NAT redundancy technique of this invention may be implemented on a general-purpose network host machine such as a personal computer or workstation. Further, the invention may be at least partially implemented on a card (e.g., an interface card) for a network device or a general-purpose computing device.

Referring now to FIG. 3, a network device 300 suitable for implementing the stateful NAT redundancy techniques of the present invention includes a master central processing unit (CPU) 310, interfaces 314, and memory 312. When acting under the control of appropriate software or firmware, the CPU 310 may be responsible for implementing specific functions associated with the functions of a desired network device. For example, when configured as a router or switch, the CPU 310 may be responsible for analyzing packets, encapsulating packets, forwarding packets to appropriate network devices, setting fragmentation size for selected links, maintaining interval and timer count values, detecting realtime set-up or disconnect signals, etc. The CPU 310 preferably accomplishes all these functions under the control of software including an operating system (e.g. Windows NT), and any appropriate applications software.

CPU 310 may include one or more processors such as a processor from the Motorola family of microprocessors or the MIPS family of microprocessors. In an alternative embodiment, processor is specially designed hardware for controlling the operations of network device 300. In a specific embodiment, memory 312 (such as non-volatile RAM and/or ROM) also forms part of CPU 310. However, there are many different ways in which memory could be coupled to the system. Memory block 312 may be used for a variety of purposes such as, for example, caching and/or storing data, programming instructions, etc.

The interfaces 314 are typically provided as interface cards (sometimes referred to as "line cards"). Generally, they control the sending and receiving of data packets over the network and sometimes support other peripherals used with the network device 300. Among the interfaces that may be provided are Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 310 to efficiently perform routing computations, network diagnostics, security functions, etc.

Although the system shown in FIG. 3 illustrates one specific network device of the present invention, it is by no means the only network device architecture on which the present invention can be implemented. For example, an architecture having a single processor that handles communications as well as routing computations, etc. is often used. Further, other types of interfaces and media could also be used with the network device.

Regardless of network device's configuration, it may employ one or more memories or memory modules configured to store data, program instructions for the general-purpose network operations and/or other information relating to the functionality of the stateful NAT redundancy techniques described herein. The program instructions may control the operation of an operating system and/or one or more applications, for example. The memory or memories may also be configured to store data structures which specify fragmentation size, timer count, interval count, real-time connection count, and scale factor values for selected links of the network.

Because such information and program instructions may be employed to implement the systems/methods described herein, the present invention relates to machine readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). The invention may also be embodied in a carrier wave travelling over an appropriate medium such as airwaves, optical lines, electric lines, etc. Examples of program instructions include both machine code, such as produced by a compiler, and files containing higher level code that may be executed by the computer using an interpreter.

Although several preferred embodiments of this invention have been described in detail herein with reference to the accompanying drawings, it is to be understood that the invention is not limited to these precise embodiments, and that various changes and modifications may be effected therein by one skilled in the art without departing from the scope of spirit of the invention as defined in the appended claims.

The invention claimed is:

1. A method for implementing redundancy of stateful network address translation (NAT) information in at least one network device of a data network, the method comprising:
receiving, at a first network device configured to perform NAT, a first NAT transaction message which includes updated NAT information, the first NAT transaction message being generated by a second network device configured to perform NAT, the updated NAT information including information relating to updates or modifications to be performed on NAT information stored at a first NAT data structure, the first NAT data structure being managed by the first network device, the first NAT transaction message including first NAT entry information relating to at least one modification of a first NAT entry associated with the first NAT data structure, the first NAT transaction message further including a first NAT ID field relating to an identity of a specific network device authorized to manage the updates or modifications regarding the first NAT entry;
determining by the first network device, using information in the first NAT ID field, whether the second network device is authorized to manage the updates or modifications to the first NAT entry at the first NAT data structure; and
modifying by the first network device the first NAT entry at the first NAT data structure using the first NAT entry information in response to a determination that the second network device is authorized to manage modifications relating to the first NAT entry;
wherein the modification of the first NAT entry at the first NAT data structure results in synchronization of NAT information relating to the first NAT entry at the first and second network devices.

2. The method of claim 1 further comprising:
determining a first portion of information relating to an identity of the second network device which generated the first NAT transaction message; and
determining, using a second portion of information in the first NAT ID field, whether the identified second network device is authorized to manage updates or modifications regarding the first NAT entry.

3. The method of claim 1 further comprising:
permitting the first network device to modify the first NAT entry at the first NAT data structure in response to a determination that the second network device is authorized to manage modifications relating to the first NAT entry.

4. The method of claim 1 further comprising:
preventing the first network device from modifying the first NAT entry at the first NAT data structure in response to a determination that the second network device is authorized to manage modifications relating to the first NAT entry.

5. A method for implementing redundancy of stateful network address translation (NAT) information in at least one network device of a data network, the method comprising:
receiving, at a first network device configured to perform NAT, a first NAT transaction message which includes updated NAT information, the first NAT transaction message being generated by a second network device configured to perform NAT, the updated NAT information including information relating to updates or modifications to be performed on NAT information stored at a first NAT data structure, the first NAT data structure being managed by the first network device; and
modifying by the first network device NAT information stored at the first NAT data structure using the updated NAT information from said first NAT transaction message to thereby achieve synchronization of NAT information stored on the first and second network devices, wherein modifying is performed without performing NAT on the first NAT transaction message, wherein modifying is performed if the first network device determines that the second network device that generated the first NAT transaction message is authorized to modify the first NAT data structure;
wherein the first network device and the second network device are each configured as traffic handling devices that are members of a first redundancy group.

6. The method of claim 1 wherein the first network device is configured as a primary traffic handling device of a primary-backup redundancy group, and wherein the second network device is configured as a backup traffic handling device of the primary-backup redundancy group.

7. The method of claim 1 wherein the first network device is configured as an active traffic handling device of an active-standby redundancy group, and wherein the second is configured as a standby traffic handling device of the active-standby redundancy group.

8. The method of claim 1 wherein the first network device is configured as a first peer traffic handling device of a peer-peer redundancy group, and wherein the second network device is configured as a second peer traffic handling device of the peer-peer redundancy group.

9. The method of claim 1 wherein the first NAT transaction message includes instructions to add a new NAT entry to the first NAT data structure.

10. The method of claim 1 wherein the first NAT transaction message includes instructions to delete a specific NAT entry stored in the first NAT data structure.

11. The method of claim 1 wherein the first NAT transaction message includes instructions to modify an existing NAT entry in the first NAT data structure.

12. A network device configured to implement redundancy of stateful network address translation (NAT) information in a data network, the network device comprising:
   at least one processor;
   at least one interface configured or designed to provide a communication link to a second network device configured to perform NAT in the data network; and
   memory;
   said at least one processor being configured to store in said memory a plurality of data structures, including:
   a first NAT data structure configured to store information relating to address translations corresponding to selected network nodes in the network, the first NAT data structure being managed by the first network device; and
   a NAT transaction data structure configured to store transactional information relating to updates or modifications performed on the first NAT data structure;
   the network device being configured or designed to:
   perform NAT;
   receive a first NAT transaction message which includes updated NAT information, the first NAT transaction message being generated by the second network device, the second network device having associated therewith a second NAT data structure, the updated NAT information including information relating to updates or modifications to be performed on NAT information stored at the first NAT data structure, the first NAT transaction message including first NAT entry information relating to at least one modification of a first NAT entry associated with the first NAT data structure, the first NAT transaction message further including a first NAT ID field relating to an identity of a specific network device authorized to manage updates or modifications regarding the first NAT entry;
   determine, using information in the first NAT ID field, whether the second network device is authorized to manage the updates or modifications to the first NAT entry at the first NAT data structure; and
   modify the first NAT entry at the first NAT data structure to incorporate the first NAT entry information in response to a determination that the second network device is authorized to manage modifications relating to the first NAT entry;
   wherein the modification of the first NAT entry at the first NAT data structure results in synchronization of NAT information relating to the first NAT entry at the first and second NAT data structures.

13. The network device of claim 12 being further configured or designed to:
   determine a first portion of information relating to an identity of the second network device which generated the first NAT transaction message; and
   determine, using a second portion of information in the first NAT ID field, whether the identified second network device is authorized to manage updates or modifications regarding the first NAT entry.

14. The network device of claim 12 being further configured or designed to:
   permit the first network device to modify the first NAT entry at the first NAT data structure in response to a determination that the second network device is authorized to manage modifications relating to the first NAT entry.

15. The network device of claim 12 being further configured or designed to:
   preventing the first network device from modifying the first NAT entry at the first NAT data structure in response to a determination that the second network device is authorized to manage modifications relating to the first NAT entry.

16. A network device for implementing redundancy of stateful network address translation (NAT) information in at least one network device of a data network, the network device comprising:
   at least one processor;
   at least one interface configured or designed to provide a communication link to a second network device configured to perform NAT in the data network; and
   memory;
   said at least one processor being configured to store in said memory a plurality of data structures, including:
   a first NAT data structure configured to store information relating to address translations corresponding to selected network nodes in the network, the first NAT data structure being managed by the first network device; and
   a NAT transaction data structure configured to store transactional information relating to updates or modifications performed on the first NAT data structure;
   the network device being configured or designed to:
   perform NAT;
   receive a first NAT transaction message which includes updated NAT information, the first NAT transaction message and the updated NAT information being generated by the second network device, the updated NAT information including information relating to updates or modifications to be performed on NAT information stored at the first NAT data structure; and
   modify NAT information at the first NAT data structure using the updated NAT information from said first NAT transaction message upon determining that the second network device is authorized to modify the NAT information at the first NAT data structure of the network device, wherein the modifying of the first NAT entry at the first NAT data structure includes updating NAT information relating to an association between a first local IP address for use in identifying a third network device and a first global IP address for use in identifying the third network device;
   wherein the first network device and the second network device are each configured as traffic handling devices that are members of a first redundancy group.

17. The network device of claim 16:
   wherein the second network device has associated therewith a second NAT data structure; and
   wherein modification of the NAT information at the first NAT data structure results in synchronization of NAT information at the first and second NAT data structures.

18. The network device of claim 16:
   wherein the network device is configured as a primary traffic handling device of a primary-backup redundancy group; and
   wherein the at least one other network device is configured as a backup traffic handling device of the primary-backup redundancy group.

19. The network device of claim 16:
   wherein the network device is configured as an active traffic handling device of an active-standby redundancy group; and wherein the at least one other network device is configured as a standby traffic handling device of the active-standby redundancy group.

20. The network device of claim 16:
wherein the network device is configured as a first peer traffic handling device of a peer-peer redundancy group; and
wherein the at least one other network device is configured as a second peer traffic handling device of the peer-peer redundancy group.

21. The network device of claim 16 wherein the NAT transaction message includes instructions to add a new NAT entry to the first NAT data structure.

22. The network device of claim 16 wherein the NAT transaction message includes instructions to delete a specific NAT entry stored in the first NAT data structure.

23. The network device of claim 16 wherein the NAT transaction message includes instructions to modify an existing NAT entry in the first NAT data structure.

24. A system for implementing redundancy of stateful network address translation (NAT) information in at least one network device of a data network, the system comprising:
means for receiving, at a first network device configured to perform NAT, a first NAT transaction message which includes updated NAT information, the first NAT transaction message being generated by a second network device configured to perform NAT, the updated NAT information including information relating to updates or modifications to be performed on NAT information stored at a first NAT data structure, the first NAT data structure being managed by the first network device, the first NAT transaction message including first NAT entry information relating to at least one modification of a first NAT entry associated with the first NAT data structure, the first NAT transaction message further including a first NAT ID field relating to an identity of a specific network device authorized to manage updates or modifications regarding the first NAT entry;
means for determining, using information in the first NAT ID field, whether the second network device is authorized to manage the updates or modifications to the first NAT entry at the first NAT data structure; and
means for modifying the first NAT entry at the first NAT data structure using the first NAT entry information in response to a determination that the second network device is authorized to manage the updates or modifications relating to the first NAT entry, wherein the modifying of the first NAT entry at the first NAT data structure includes updating NAT information relating to an association between a first local IP address for use in identifying a third network device and a first global IP address for use in identifying the third network device;
wherein modification of the first NAT entry at the first NAT data structure results in synchronization of NAT information relating to the first NAT entry at the first and second network devices;
means for determining a first portion of information relating to an identity of the second network device which generated the first NAT transaction message; and
means for determining, using a second portion of information in the first NAT ID field, whether the identified second network device is authorized to manage the updates or modifications regarding the first NAT entry; and
means for preventing the first network device from modifying the first NAT entry at the first NAT data structure in response to a determination that the second network device is not authorized to manage the updates or modifications relating to the first NAT entry;
wherein the first network device and the second network device are each configured as traffic handling devices that are members of a first redundancy group.

25. A system for implementing redundancy of stateful network address translation (NAT) information in a data network, the system comprising:
a first NAT device comprising a first processor, a first memory, and a first NAT data structure configured to store information relating to address translations associated with selected network nodes in the network, the first NAT data structure being managed by the first NAT device, the first NAT device operable to:
identify a first network device;
associate a local IP address with the first network device and a global IP address with the first network device;
update a first NAT entry at the first NAT data structure using first network device network address association information;
generate and send a first NAT transaction message by the first NAT device, wherein the first NAT transaction message includes updated NAT information including information relating to updates or modifications to be performed on NAT information stored at a second NAT data structure, the first NAT transaction message including first NAT entry information relating to at least one modification of a second NAT entry associated with the second NAT data structure, the first NAT transaction message further including a first NAT ID field relating to an identity of the first NAT device as a specific network device authorized to manage updates or modifications regarding the second NAT entry, the first NAT transaction message including the network address association information;
a second NAT device comprising a second processor, a second memory, and the second NAT data structure configured to store information relating to address translations associated with selected network nodes in the network, the second NAT data structure being managed by the second NAT device, the second NAT device operable to:
receive by the second NAT device the first NAT transaction message generated by the first NAT device;
determine by the second NAT device, using information in the first NAT ID field, whether the first network device is authorized to manage the updates or modifications to the second NAT entry at the second NAT data structure;
modify by the second NAT device the second NAT entry at the second NAT data structure using the first NAT entry information relating to at least one modification of the second NAT entry in response to a determination that the first network device is authorized to manage the updates or modifications relating to the second NAT entry,
wherein modification of the second NAT entry at the second NAT data structure results in synchronization of NAT information relating to the first and second NAT entries at the first and second NAT data structures.

26. A NAT device configured to implement redundancy of stateful network address translation (NAT) information in a data network, the NAT device comprising:
at least one processor;
at least one interface configured or designed to provide a communication link to a second network device configured to perform NAT in the data network; and
memory;

said at least one processor being configured to store in said memory a plurality of data structures, including:

a first NAT data structure configured to store information relating to address translations corresponding to selected network nodes in the network, the first NAT data structure being managed by the first network device; and a NAT transaction data structure configured to store transactional information relating to updates or modifications performed on the first NAT data structure;

the NAT device being configured or designed to:

perform NAT;

receive a first NAT transaction message which includes updated NAT information, the first NAT transaction message being generated by the second network device, the second network device having associated therewith a second NAT data structure, the updated NAT information including information relating to updates or modifications to be performed on NAT information stored at the first NAT data structure, the first NAT transaction message including first NAT entry information relating to at least one modification of a first NAT entry associated with the first NAT data structure, the first NAT transaction message further including a first NAT ID field relating to an identity of a specific network device authorized to manage updates or modifications regarding the first NAT entry;

determine, using information in the first NAT ID field, whether the second network device is authorized to manage the updates or modifications to the first NAT entry at the first NAT data structure; and modify the first NAT entry at the first NAT data structure using the first NAT entry information from the first NAT transaction message in accordance with the determination of whether the second network device is authorized to manage the updates or modifications to the first NAT entry at the first NAT data structure, wherein the modifying of the first NAT entry at the first NAT data structure includes updating NAT information relating to an association between a first local IP address for use in identifying a third network device and a first global IP address for use in identifying the third network device;

wherein modification of the first NAT entry at the first NAT data structure results in synchronization of NAT information relating to the first NAT entry at the first and second NAT data structures.

27. The NAT device of claim 26 wherein the NAT device is operable to modify the first NAT entry at the first NAT data structure in response to a determination that the second network device is authorized to initiate modifications relating to the first NAT entry.

28. The method as recited in claim 1, wherein the first network device and the second network device are routers.

29. The method as recited in claim 1, wherein the first network device includes the first NAT data structure.

30. The method as recited in claim 1, wherein the first NAT transaction message is not a data packet.

* * * * *

UNITED STATES PATENT AND TRADEMARK OFFICE
CERTIFICATE OF CORRECTION

| | | |
|---|---|---|
| PATENT NO. | : 7,894,427 B2 | Page 1 of 1 |
| APPLICATION NO. | : 11/328804 | |
| DATED | : February 22, 2011 | |
| INVENTOR(S) | : Jayasenan et al. | |

It is certified that error appears in the above-identified patent and that said Letters Patent is hereby corrected as shown below:

On the COVER PAGE add the following:

--Related U.S. Application Data

(63)  Continuation of application No. 09/735,199, filed on December 11, 2000, now Pat. No. 7,042,876

(60)  Provisional application No. 60/232,152, filed on September 12, 2000--

Signed and Sealed this

Thirty-first Day of May, 2011

David J. Kappos
*Director of the United States Patent and Trademark Office*